United States Patent
Dohrman et al.

(10) Patent No.: US 7,180,648 B2
(45) Date of Patent: Feb. 20, 2007

(54) ELECTRO-ABSORPTION MODULATOR DEVICE AND METHODS FOR FABRICATING THE SAME

(75) Inventors: Carl Dohrman, Somerville, MA (US); Saurabh Gupta, Cambridge, MA (US); Eugene A. Fitzgerald, Windham, NH (US)

(73) Assignee: Massachusetts Institute of Technology, Cambridge, MA (US)

( * ) Notice: Subject to any disclaimer, the term of this patent is extended or adjusted under 35 U.S.C. 154(b) by 18 days.

(21) Appl. No.: 11/151,610

(22) Filed: Jun. 13, 2005

(65) Prior Publication Data

US 2006/0279829 A1 Dec. 14, 2006

(51) Int. Cl.
*G02F 1/03* (2006.01)
*G02F 1/01* (2006.01)
*H01L 31/0328* (2006.01)
*H01L 31/12* (2006.01)
*H01S 5/00* (2006.01)

(52) U.S. Cl. ............. 359/248; 359/240; 359/245; 359/321; 359/263; 359/278; 257/12; 257/14; 257/17; 257/20; 257/21; 257/79; 257/431; 372/26; 372/45.01; 372/50.1; 372/50.11; 398/183

(58) Field of Classification Search ........ 359/240–248, 359/256, 321; 257/12–15, 17, 20, 21, 79, 257/85, 94, 101, 102, 431; 372/26, 45.01, 372/46, 50.1, 50.11; 438/20, 22, 28, 48; 385/2, 8, 132; 398/183
See application file for complete search history.

(56) References Cited

U.S. PATENT DOCUMENTS 4,705,361 A * 11/1987 Frazier et al. ............. 359/263

(Continued)

FOREIGN PATENT DOCUMENTS

EP 0154504 A2 9/1985

(Continued)

OTHER PUBLICATIONS

Nature, Silicon-based quantum wells, vol. 364, 1993, p. 19.

(Continued)

*Primary Examiner*—Loha Ben
(74) *Attorney, Agent, or Firm*—Wolf, Greenfield & Sacks, P.C.

(57) ABSTRACT

An electro-absorption light intensity modulator device is provided that comprises a first and a second layer disposed relative to the first layer so as to provide a light-absorbing optical confinement region. The first layer comprises a first insulator layer, and the light-absorbing optical confinement region comprises at least one quantum-confined structure. The at least one quantum-confined structure possesses dimensions such, that upon an application of an electric field in the at least one quantum-confined structure, light absorption is at least partially due to a transition of at least one carrier between a valence state and a conduction state of the at least one quantum-confined structure. A method is also provided for fabricating an electro-absorption light intensity modulator device. The method comprises providing a first insulator layer, disposing a light absorption region over the first insulator layer, and disposing a second insulator layer over the light absorption region, wherein light absorption region comprises at least one quantum-confined structure. The at least one quantum-confined structure possesses dimensions such that, upon an application of an electric field in the at least one quantum-confined structure, light absorption is at least partially due to a transition of at least one carrier between a valence state and a conduction state of the at least one quantum-confined structure.

23 Claims, 23 Drawing Sheets

U.S. PATENT DOCUMENTS

| | | | |
|---|---|---|---|
| 4,847,573 A | | 7/1989 | Fukuzawa et al. |
| 5,079,601 A | * | 1/1992 | Esaki et al. .................. 257/22 |
| 5,105,301 A | * | 4/1992 | Campi ........................ 359/245 |
| 5,200,969 A | * | 4/1993 | Paoli ......................... 372/50.1 |
| 5,291,034 A | * | 3/1994 | Allam et al. .................. 257/17 |
| 5,324,959 A | * | 6/1994 | Nakamura et al. ............ 257/17 |
| 5,416,338 A | * | 5/1995 | Suzuki et al. .................. 257/21 |
| 5,428,225 A | * | 6/1995 | Silva et al. .................... 257/14 |
| 5,481,397 A | * | 1/1996 | Burt ............................ 359/298 |
| 5,521,742 A | * | 5/1996 | Ishimura ..................... 359/248 |
| 5,671,437 A | * | 9/1997 | Taira .......................... 327/187 |
| 5,717,710 A | * | 2/1998 | Miyazaki et al. ........ 372/50.11 |
| 5,804,840 A | * | 9/1998 | Ochi et al. .................... 257/94 |
| 5,936,258 A | * | 8/1999 | Imamura et al. ............... 257/21 |
| 6,437,361 B1 | * | 8/2002 | Matsuda ...................... 257/21 |
| 6,506,176 B1 | * | 1/2003 | Mittelstein et al. ........... 604/22 |
| 6,597,011 B1 | * | 7/2003 | Atanackovic ................ 257/20 |
| 6,771,410 B1 | | 8/2004 | Bourlanoff et al. |
| 6,852,556 B2 | | 2/2005 | Yap |
| 7,142,342 B2 | * | 11/2006 | Bour et al. .................. 359/244 |
| 2002/0066718 A1 | | 6/2002 | Matsuyama |
| 2004/0150865 A1 | * | 8/2004 | Chen et al. .................. 359/252 |

FOREIGN PATENT DOCUMENTS

WO     WO 2004/053938 A2     6/2004

OTHER PUBLICATIONS

Liu et al., Nature 427, 2004, p. 615-618.
Friedman et al., A Proposed Electoabsorption Modulator at 1.55 μm in Silicon/Silicon-Germanium Asymmetric Quantum-Well Structures, IEEE Phototonics Technology Letters, vol. 5, No. 10, 1993, p. 1200-1202.
Zelikson et al., Treshold and saturation effects for photosignals in an amorphous silicon waveguide structure, Applied Phys. Letters: American Institute of Physics., vol. 59, No. 21, 1991, p. 2660-2662.
Written Opinion and International Search Report for PCT/US2006/023050, dated Oct. 27, 2006.
Phelan, Jr. et al., Subnanosecond electrical modulation of light with hydrogenated amorphous silicon, Applied Physics Letters USA, vol. 38, No. 8, 1981, pp. 586-598.

* cited by examiner

ELECTRO-ABSORPTION MODULATOR DEVICE AND METHODS FOR FABRICATING THE SAME

FIELD OF INVENTION

The invention relates to electro-absorption light intensity modulator devices, and more specifically to electro-absorption light intensity modulator devices comprising quantum-confined structures.

BACKGROUND OF INVENTION

While a great deal of progress has been made in silicon photonics in recent years, one persistent challenge that continues to plague the field is the fabrication of an optical modulator that satisfies the complex demands of performance, size, power dissipation, ease of fabrication, and CMOS-compatibility required to solve the optical interconnect problem. Over the years, a diverse array of modulator concepts for optical interconnects have been proposed, including electro-absorption modulators (EAM), plasma dispersion modulators, and direct free carrier absorption modulators.

For example, a prior art plasma dispersion modulator fabricated by Liu et al. (Nature 427, p. 615–618 (2004)) employs free carrier plasma dispersion by using a MOS capacitor to change the carrier density in the device. This plasma dispersion modulator can be used as an optical modulator on silicon for optical interconnects, operating at speeds over 1 GHz.

However, the aforementioned plasma dispersion modulator may have significant drawbacks that might make it impractical for use with optical interconnect systems. First, the free carrier plasma dispersion effect is relatively weak, and hence the device may need to be quite large (e.g., greater than about 1 mm). In microelectronics, devices are typically orders of magnitude smaller, so the aforementioned plasma dispersion modulator may consume large amounts of chip area, and may dissipate a substantial amount of power.

SUMMARY OF INVENTION

In some embodiments, an electro-absorption light intensity modulator device comprises a first and a second layer disposed relative to the first layer so as to provide a light-absorbing optical confinement region. The first layer comprises a first insulator layer, and the light-absorbing optical confinement region comprises at least one quantum-confined structure. The at least one quantum-confined structure possesses dimensions such that, upon an application of an electric field in the at least one quantum-confined structure, light absorption is at least partially due to a transition of at least one carrier between a valence state and a conduction state of the at least one quantum-confined structure.

In some embodiments, a waveguide integrated electro-absorption light intensity modulator device comprises an optical waveguide that comprises an optical waveguide core and an insulating clad, and a light absorption region disposed within at least a portion of the optical waveguide core. The light absorption region comprises at least one quantum-confined structure, wherein the at least one quantum-confined structure possesses dimensions such that, upon an application of an electric field in the at least one quantum-confined structure, light absorption is at least partially due to a transition of at least one carrier between a valence state and a conduction state of the at least one quantum-confined structure.

In some embodiments, a method is provided for fabricating an electro-absorption light intensity modulator device. The method comprises providing a first insulator layer, disposing a light absorption region over the first insulator layer, and disposing a second insulator layer over the light absorption region, wherein light absorption region comprises at least one quantum-confined structure. The at least one quantum-confined structure possesses dimensions such that, upon an application of an electric field in the at least one quantum-confined structure, light absorption is at least partially due to a transition of at least one carrier between a valence state and a conduction state of the at least one quantum-confined structure.

BRIEF DESCRIPTION OF DRAWINGS

In the drawings, each identical or nearly identical component that is illustrated in various figures is represented by a like numeral. For purposes of clarity, not every component may be labeled in every drawing. In the drawings.

DETAILED DESCRIPTION

Figure 1A:
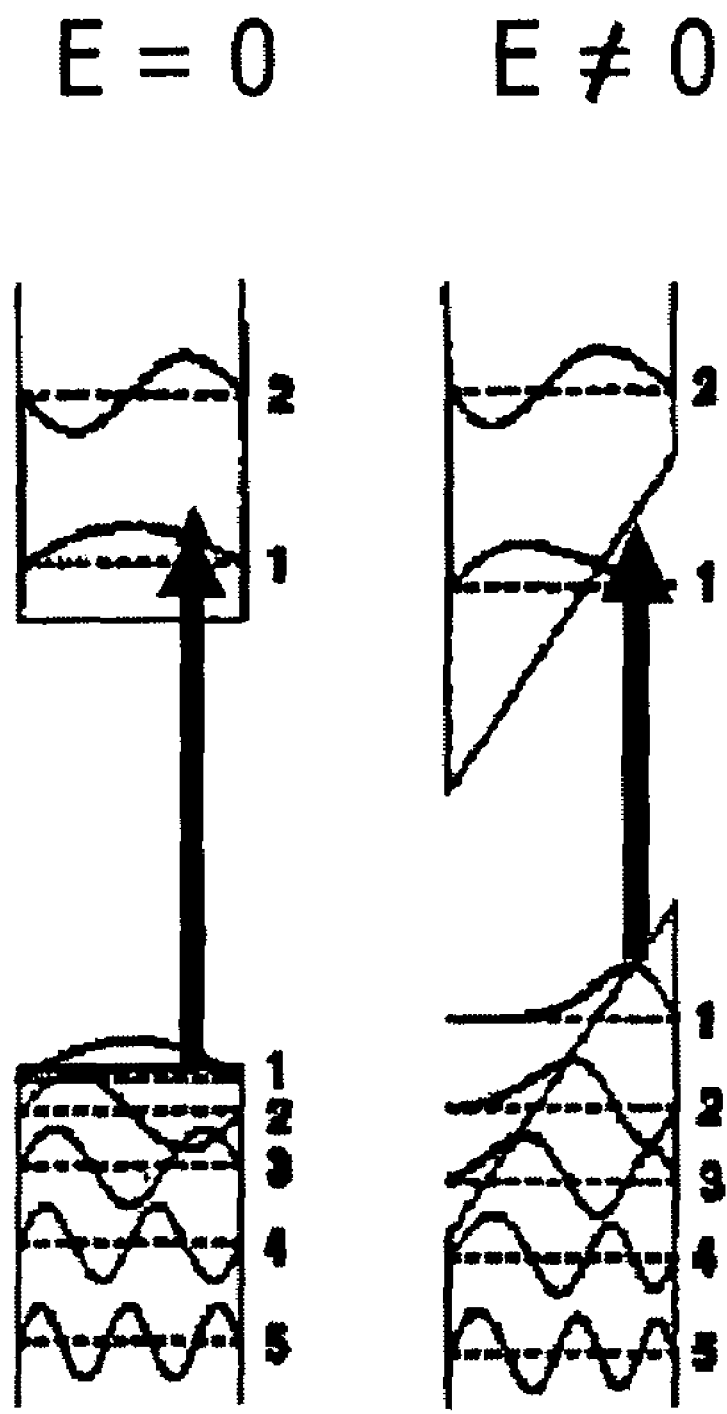
FIG. 1a is a schematic illustration of energy levels in a (prior art) quantum confined structure, in the absence and presence of an electric field.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In contrast to plasma dispersion modulators, EAM devices utilizing the quantum-confined Stark effect (QCSE), as further explained, can be made smaller since the QCSE can exhibit a stronger effect than plasma dispersion. Due to their smaller size, it is believed that EAM modulators will also consume less power than plasma dispersion modulators.

The QCSE is a well-known phenomena whereby a shift of the absorption spectrum of a quantum-confined structure to lower energies occurs upon the application of an electric field. As shown in the energy level diagram of FIG. 1a, an applied electric field (E) lowers the ground state energy of electrons and holes in the quantum-confined active region, thus lowering the photon energy required to promote an electron from the valence band to the conduction band.

Figure 1B:
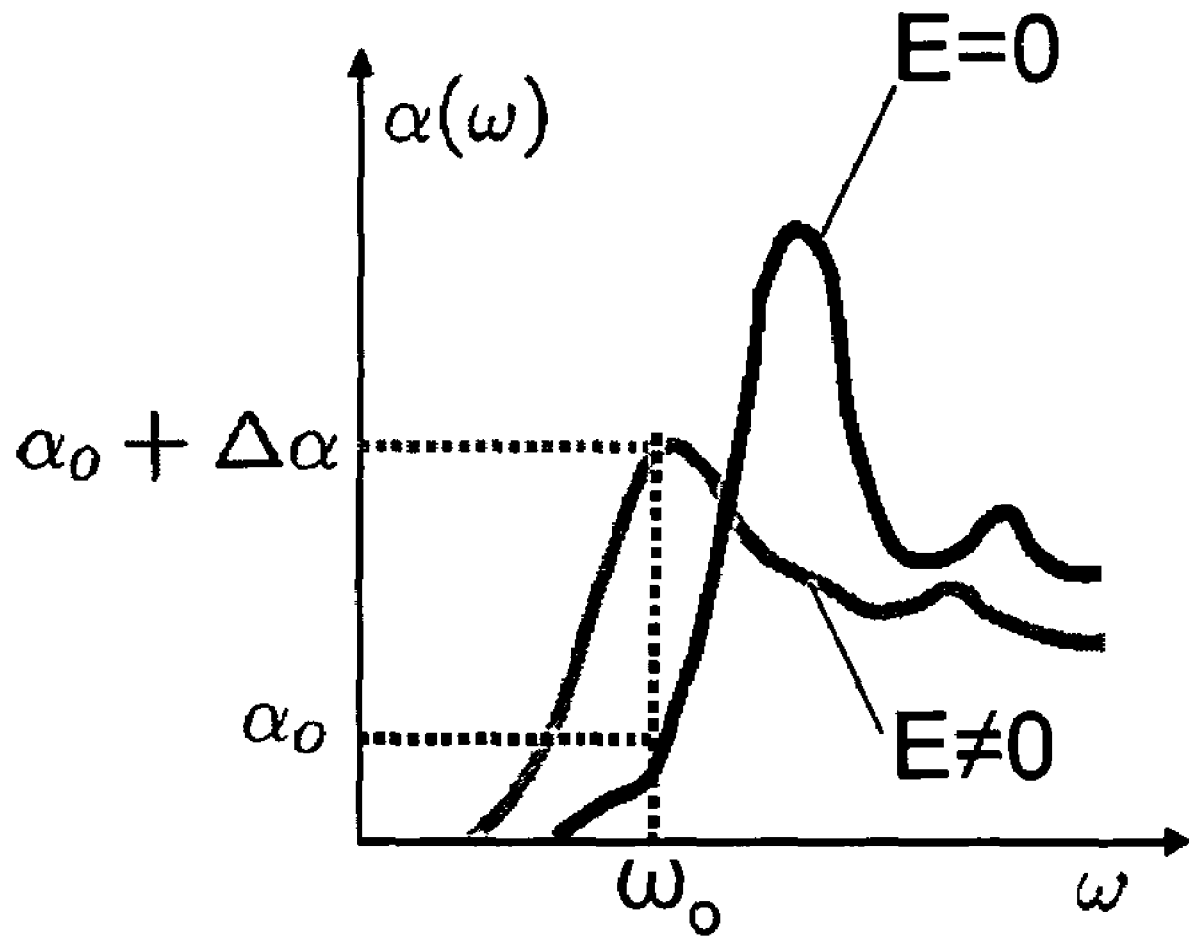
FIG. 1b is a graph showing the absorption coefficient spectrum for a (prior art) quantum-confined structure, in the absence and presence of an electric field.

As depicted in FIG. 1b, the light absorption coefficient ($\alpha(\omega)$) of the quantum-confined structure, for a photon frequency $\omega=\omega_o$, increases from $\alpha_o$ (for the E=0 curve) to $\alpha_o+\Delta\alpha$ (for the E≠0 curve) upon the application of an electric field E. Thus, if the wavelength of an optical beam is chosen such that the structure absorbs light when an electric field is applied but does not significantly absorb light when no electric field is present, then the light intensity can be modulated via the application of an electric field.

Figure 2:
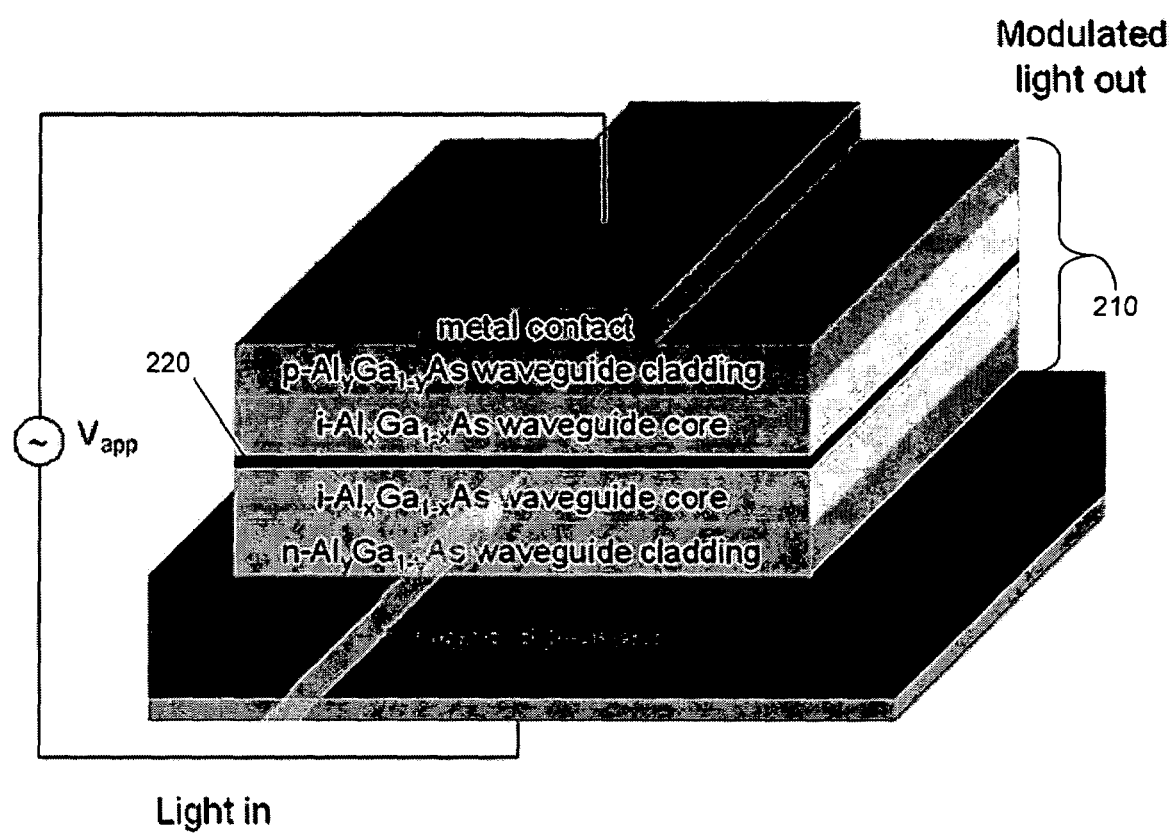
FIG. 2 is a schematic illustration of a prior art EAM device.

In prior art EAM devices that use the QCSE, an electric field is applied to the structure through a semiconductor heterostructure 210, as shown in the prior art EAM of FIG. 2. The device layers in the heterostructure 210 are doped so that the whole structure forms a p-i-n diode; and the electric field is generated by applying a reverse voltage bias to the diode by source $V_{app}$. The active region is an ultrathin semiconductor layer 220 (i.e., a quantum well) with a lower band gap energy than the surrounding semiconductor, ensuring that electrons and holes are preferentially confined to this region. These prior art EAM devices are composed of single-crystalline layers that are grown epitaxially; therefore, device structure 210 only includes crystalline materials.

An EAM device comprising non-epitaxially deposited layers, however, can relax materials selection restrictions imposed by the use of only epitaxially deposited layers. Alleviation of materials selection restrictions can enable the integration of EAM devices with microelectronics platforms and process technologies (e.g., silicon microelectronics processing) and/or improve EAM device performance as compared to prior art EAM devices.

In particular, the alleviation of materials selection restrictions can allow for the fabrication of an EAM device including one or more insulating optical clad layers and/or quantum-confined structures (e.g., quantum wells and/or quantum dots) in the EAM device absorption region.

Figure 3:
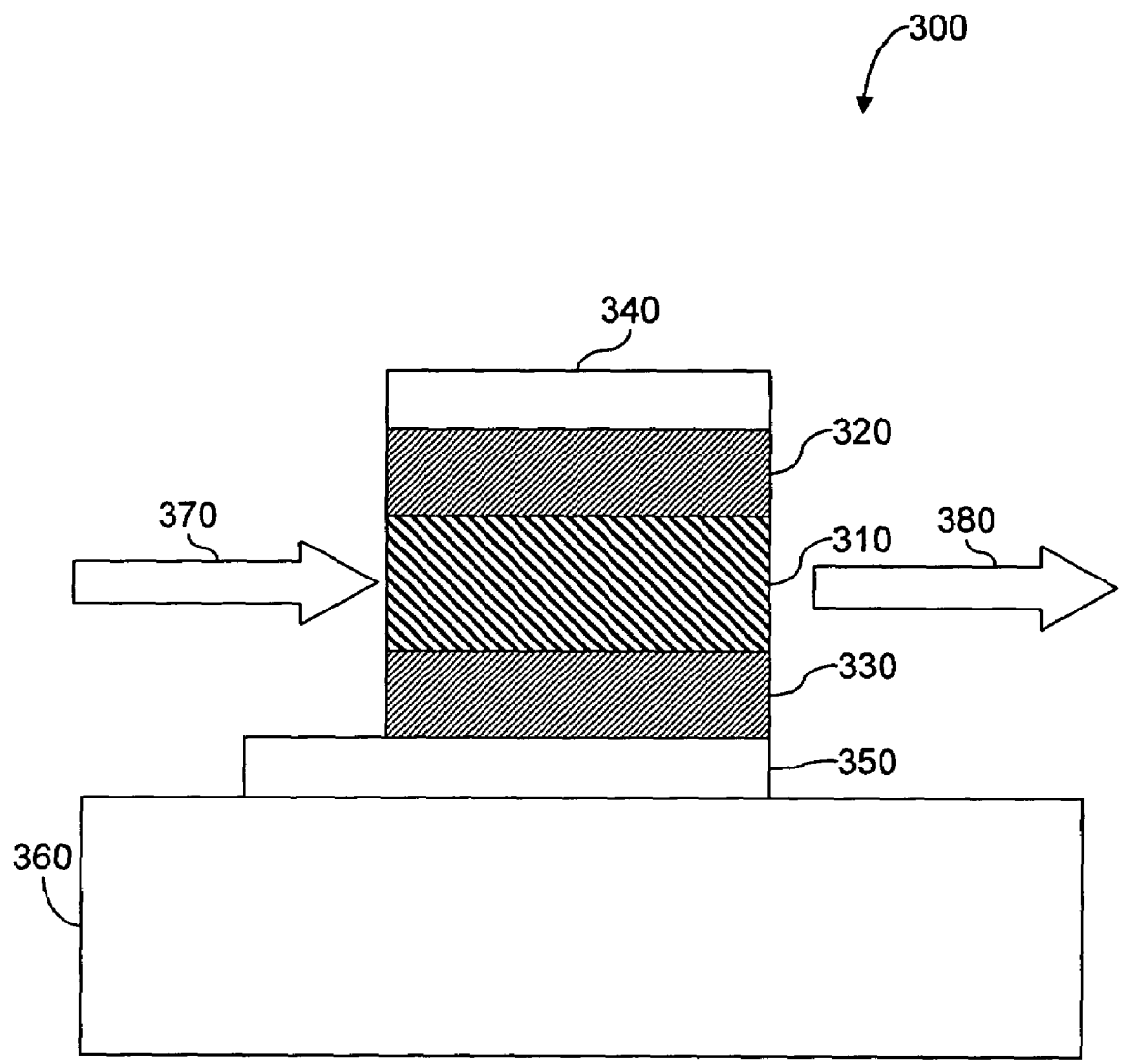
FIG. 3 is a schematic illustration of an EAM device comprising a core region.

FIG. 3 shows one embodiment of such an EAM 300 comprising a core region 310, and first and second optical clad regions, 320 and 330.

The first optical clad region 320 and/or the second optical clad region 330 can comprise an insulator. In some embodiments, the first optical clad region 320 and/or the second optical clad region 330 may comprise a material other than an insulator, for example a semi-conductor.

The EAM 300 may also include a first electrode 340 disposed over the first optical clad region 320. A second electrode 350 may be disposed under the second optical clad region 330, and over a substrate 360. Voltages may be applied to the first electrode 340 and the second electrode 350, so as to generate an electric field within the core region 310.

The substrate 360 may comprise any material or combination of materials, including a silicon substrate, a germanium substrate, a III-V substrate, or any other material, as the invention is not limited in this respect. In some embodiments, the substrate 360 is a conducting substrate which can facilitate the use of a backside electrode (not shown) on the bottom of substrate 360, instead of the second electrode 350. In some embodiments, the substrate 360 is an insulating or semi-insulating substrate.

The core region 310 can comprise a light absorption region that may absorb light of specific wavelengths. In one embodiment, the core region 310 may comprise quantum-confined structures, including quantum wells and/or quantum dots. Multiple quantum-confined structures may be included in the core region 310, and they can all comprise the same material or they may be comprised different materials. For example, a core region 310 may include some quantum-confined structures comprising a first material (e.g., silicon, germanium, a III-V semiconductor, a II-VI semiconductor, etc.), and other quantum-confined structures comprising a second material different from the first material.

An incoming light beam 370 can enter the EAM core region 310 as shown (i.e., laterally, not vertically through electrode 340 and clad region 320), and an outgoing light beam 380 can exit the EAM 300. As light passes through the core region 310, the light intensity can be modulated by a change in the absorption coefficient of the core region 310. The absorption of light may be varied by applying a voltage to electrodes 340 and 350, which generates an electric field within the core region 310. In one embodiment, the electric field can contribute to a quantum-confined Stark effect within quantum-confined structures in the core region 310, resulting in a shift in the absorption spectrum of the quantum-confined structures (e.g., quantum wells, quantum dots) to lower energies.

Figure 4:
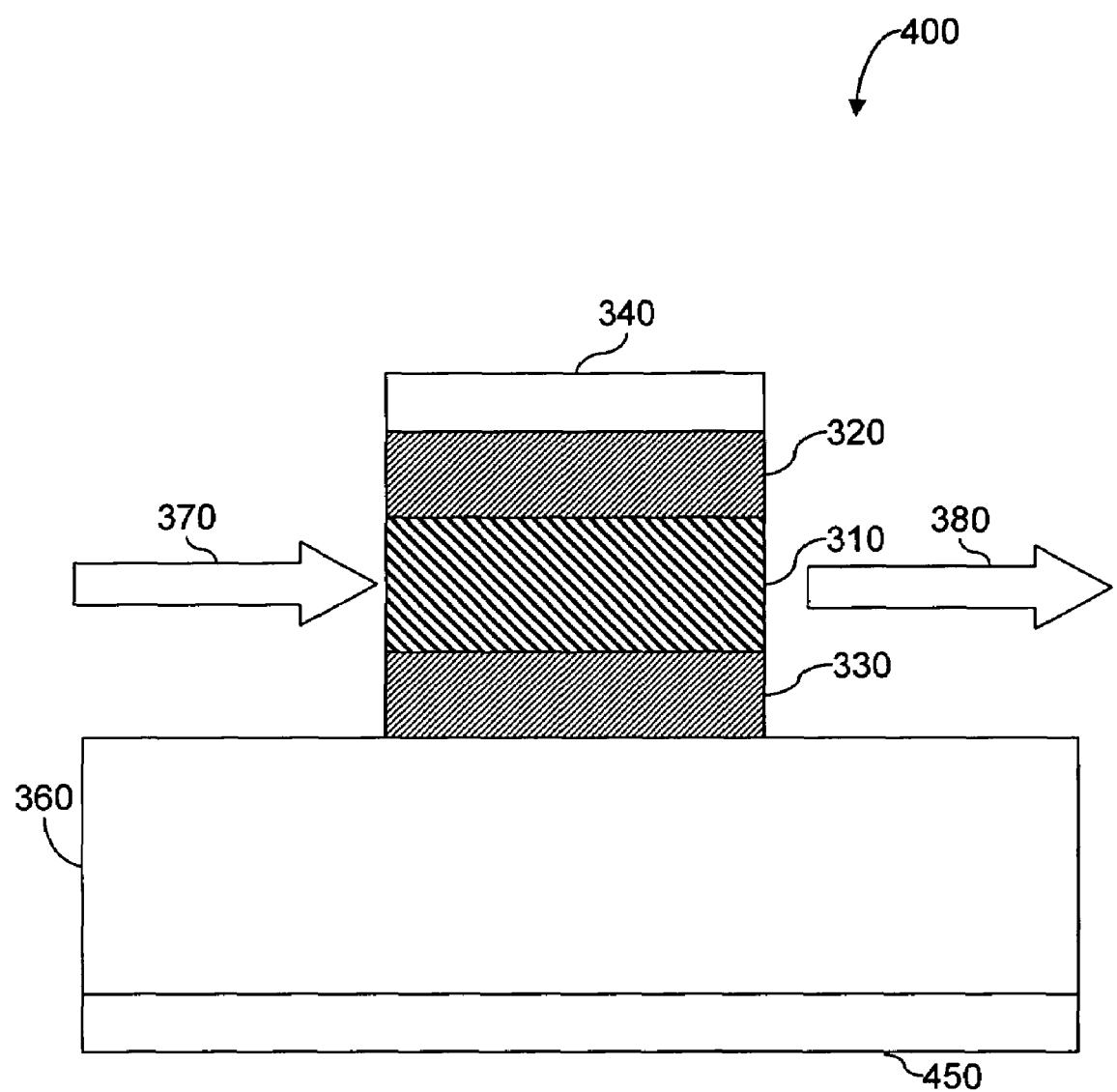
FIG. 4 is a schematic illustration of an EAM device comprising a backside electrode.

FIG. 4 shows one embodiment of an EAM 400 comprising a core region 310, and first and second optical clad regions, 320 and 330, as was discussed for EAM 300. EAM 400 comprises a second electrode 450 on the backside of the substrate 360. In this embodiment, the substrate 360 may be a conducting substrate, which can allow for the communication of a voltage applied to the backside electrode 450 through the substrate 360. For example, the conducting substrate may comprise a highly doped semiconductor substrate, with dopant concentrations greater than or equal to about $1\times10^{16}$ dopants/cm$^3$, preferably $1\times10^{17}$ dopants/cm$^3$.

Figure 5A:
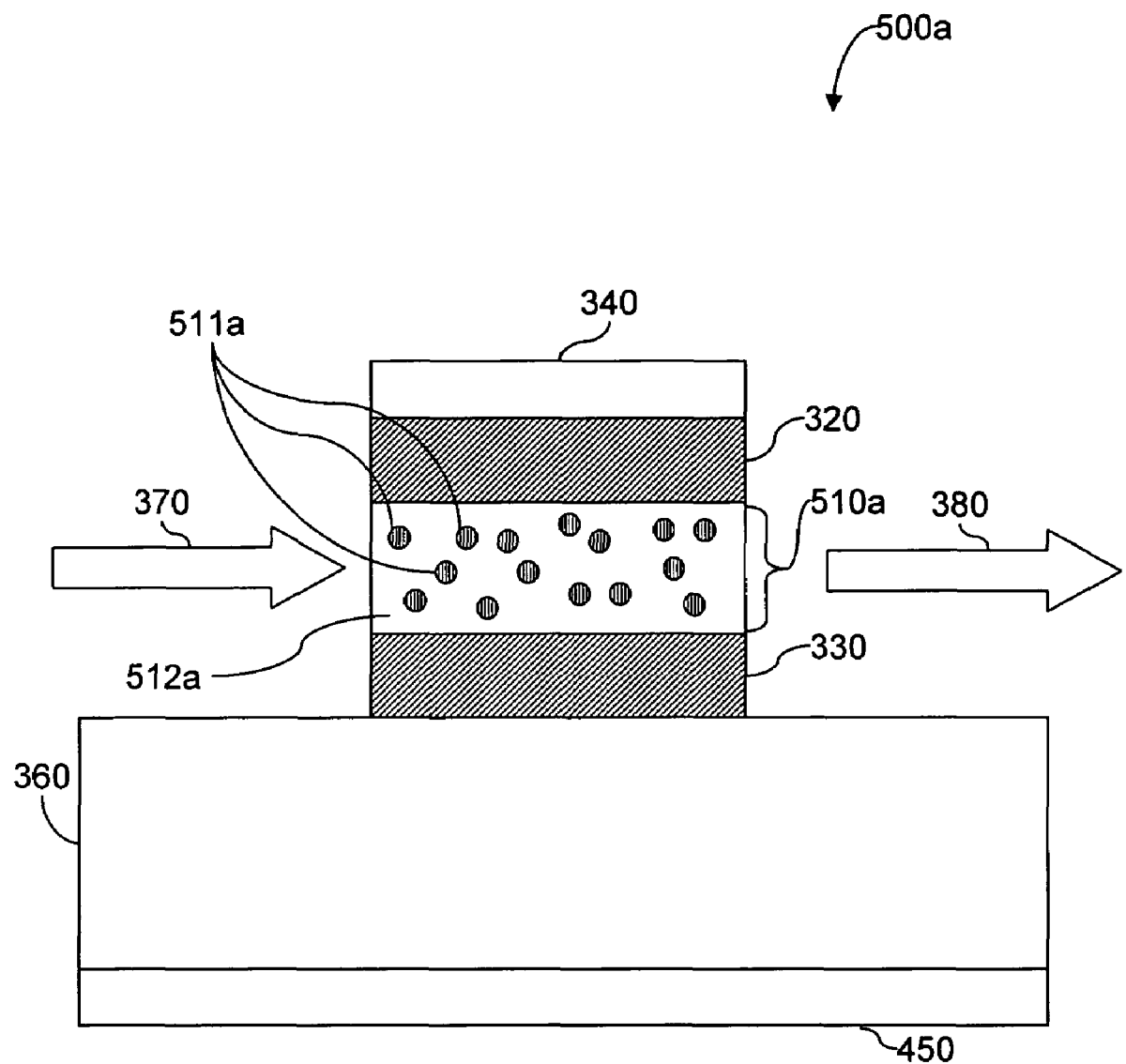
FIG. 5a is a schematic illustration of an EAM device comprising quantum dots.

In some embodiments, the EAM core region may comprise quantum dots. FIG. 5a shows one embodiment of an EAM 500a comprising a core region 510a including quantum dots 511a in a matrix 512a. The quantum dots may comprise semiconductor quantum dots, and may possess a size such that carriers (e.g., electrons and/or holes) within the quantum dots experience quantum confinement. The quantum dots may be suspended in the matrix 512a, which can comprise any suitable material. In some embodiments, the matrix 512a may comprise an insulator. For example, the matrix 512a may comprise an oxide (e.g., silicon dioxide), a nitride (e.g., silicon nitride), a carbide (e.g., silicon carbide), any mixture of the above materials (e.g., silicon oxynitride), or any other material, as the invention is not limited in this respect.

Quantum dots 511a can comprise silicon, germanium, III-V semiconductors (e.g., gallium arsenide, gallium phosphide, indium phosphide, etc.), II-VI semiconductors (e.g., cadmium selenide, zinc selenide, cadmium telluride, zinc telluride, etc.), or any other material, as the invention is not limited in this respect. The core region 310 may comprises quantum dots with a diameter less that 10 nm, preferably less that 5 nm. The core region 310 can comprise silicon quantum dots with a diameter less than 5 nm, preferably less than 3 nm. The silicon quantum dots can reside in a matrix comprising an insulating material (e.g., silicon oxide, silicon nitride, silicon carbide, and/or silicon oxynitride) and/or any other material, as the invention is not limited in this respect.

Figure 5B:
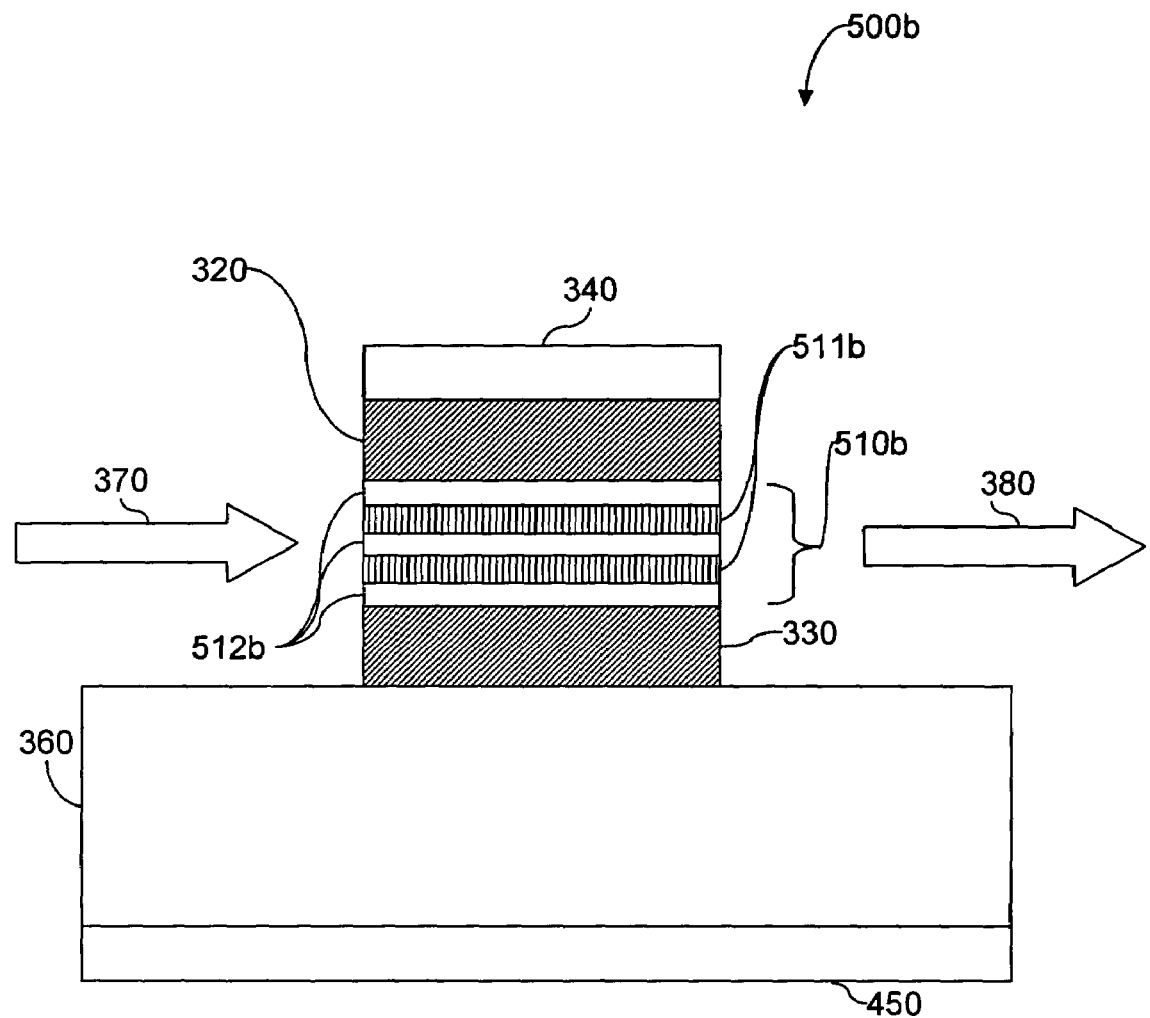
FIG. 5b is a schematic illustration of an EAM device comprising quantum wells.

In some embodiments, the EAM core region may comprise one or more quantum wells. FIG. 5b shows one embodiment of an EAM 500b comprising a core region 510b including quantum wells 511b and separation layers 512b. The quantum wells may be oriented such that the confinement dimension of the quantum wells lies along the normal of the upper surface of substrate 360, so that a voltage applied to the electrodes 340 and 350 can generate an electric field along the confinement dimension of the quantum wells.

The quantum wells 511b may be separated by any material that forms a suitable potential barrier providing carrier quantum confinement. The quantum wells 511b may be separated by semiconductor and/or insulating materials possessing bandgaps larger than the quantum wells. To provide a larger potential barrier, the quantum wells 511b may be separated by a wide bandgap semiconductor, an insulator, and/or any other material possessing a bandgap larger than the quantum wells. Examples of wide bandgap semiconductors include nitride-based semiconductors and carbide-based semiconductors. The quantum wells 511b may be separated by an insulating material, including an oxide, a nitride, a carbide, or any other suitable insulator, as the invention is not limited in this respect. Examples of oxides, nitrides, and carbides include silicon oxide, silicon nitride, and silicon carbide, respectively. Any mixture of different insulating materials may be used to separate the quantum wells 511b, including silicon oxynitride, silicon oxycarbide, or any other suitable mixture, as these are merely examples, and the invention is not limited in this respect.

The quantum wells 511b may comprise any material, including any semiconductor, and can be composed of crystalline, poly-crystalline, and/or amorphous materials. Semiconductor quantum wells may be comprised of silicon, germanium, silicon germanium, any III-V semiconductor, any II-VI semiconductor, or any other semiconductor material, as the invention is not limited in this respect. When more than one quantum well 511b is used, the quantum wells 511b may be comprised of the same material, or may be comprised of different materials, as the invention is not limited in this respect.

In some embodiments, an EAM device may be integrated with an optical waveguide, wherein one segment of the optical waveguide can couple light into the EAM device and another segment of the optical waveguide can couple light out of the EAM device.

Figure 6:
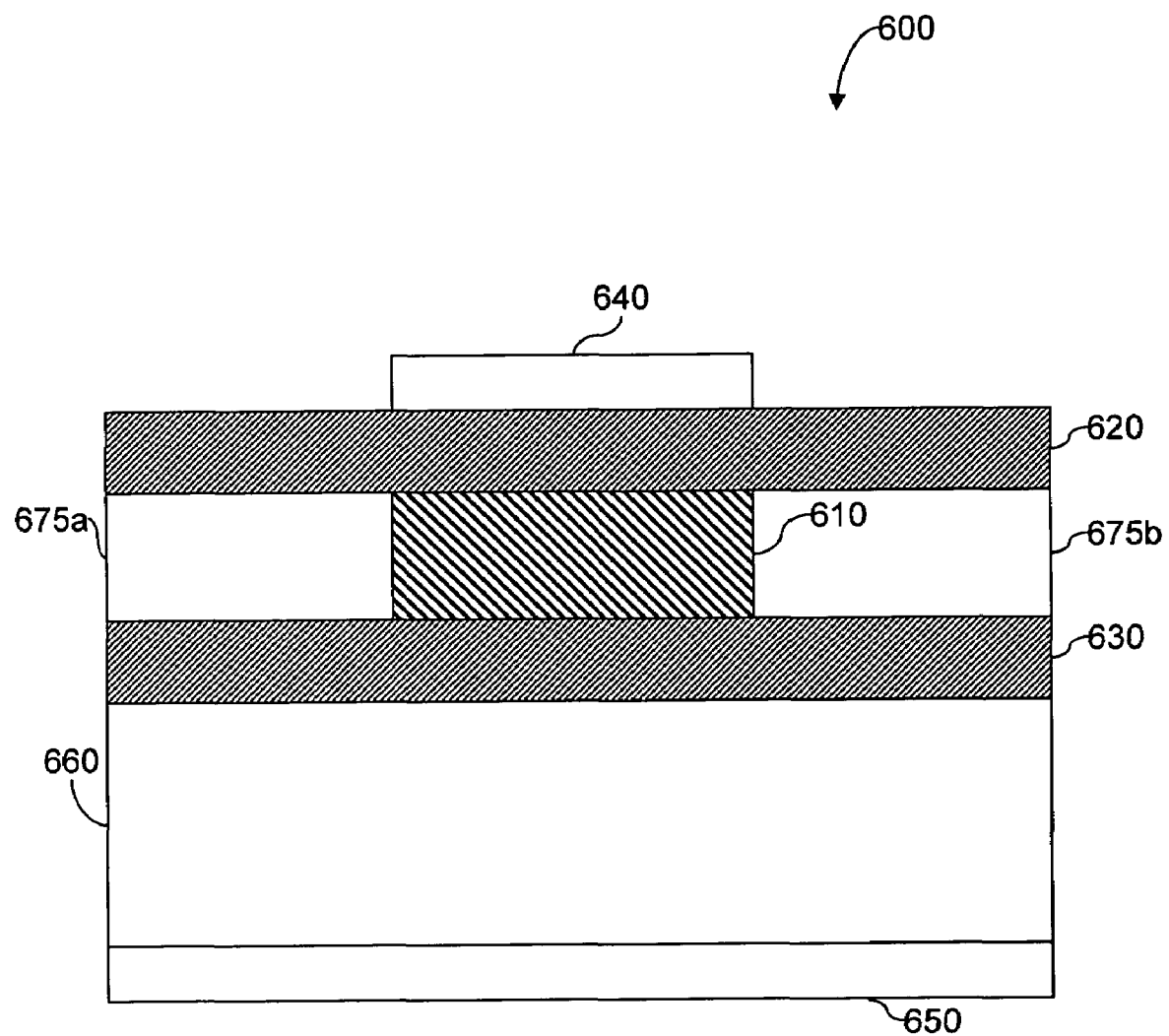
FIG. 6 is a schematic illustration of an integrated EAM waveguide system.

FIG. 6 shows one such type of embodiment of an integrated EAM waveguide system 600. The integrated EAM waveguide system 600 can comprise an EAM core region 610, and waveguide core regions 675a and 675b. The EAM core region 610 and the waveguide core regions 675a and 675b may be clad by optical cladding layers 620 and 630.

The optical waveguide segments, formed by waveguide core regions 675a and 675b with surrounding cladding layers 620 and 630, can provide optical confinement for light traveling along the optical waveguide segments. To ensure optical confinement of light of a given wavelength, the index of refraction of the waveguide core regions 675a and 675b can be chosen to be larger than the index of refraction of the optical cladding layers 620 and 630. The waveguide core regions 675a and 675b may comprise silicon oxynitride, and the optical cladding layers 620 and 630 may comprise silicon oxide. Other material combinations can provide suitable optical confinement, as the invention is not limited in this respect.

Although only shown as finite straight segments in FIG. 6, the optical waveguide segments can extend to any location on the substrate 660 and may comprise bends so as to steer light to any location on the substrate 660. The optical waveguide segments can also be coupled to other components, in addition to being coupled to the EAM device. In some embodiments, the optical wave may be coupled to a light emitting device, including a laser and/or a light emitting diode. Light emitted from the laser and/or LED can be guided into the EAM device via the optical waveguide segments, and the light intensity can be modulated via the application of a voltage difference between electrodes 640 and 650.

As noted in the description of FIGS. 3–5, the EAM core region 610 may include quantum-confined structures, including quantum dots and/or one or more quantum wells. The quantum-confined structures can exhibit a QCSE upon the application of a voltage difference between the electrodes 640 and 650, thereby influencing the absorption of light in the EAM core region 610 upon the application of a voltage difference between electrodes 640 and 650.

Voltages applied to the electrodes 640 and 650 can create an electric field within the EAM core region 610. The applied voltage may be varied so that the electric field within the core region 610 can be modulated, and in turn, the light absorption coefficient of the EAM core region 610 may be modulated. Light traveling along the waveguide core segment 675a can enter the EAM core region 610 and the light intensity may be modulated as a result of changes in the absorption coefficient.

The EAM core region 610 can be designed to comprise appropriately sized quantum-confined structures possessing an absorption edge (versus wavelength) at about the wavelength of the light. As is well known in the art, the size a quantum-confined structure can determine the location of the absorption edge due to energy level shifts caused by quantum confinement of carriers. A voltage applied to the electrodes 640 and 650 can shift the absorption edge due to the QCSE, and as a result cause a modulation the intensity of light transmitted through the EAM core region 610.

In some embodiments, the length of the EAM core region 610 may be chosen so that the application of a specified voltage difference between the electrodes 640 and 650 can result in an applied electric field and an increase in the absorption coefficient of the EAM core region 610 so that the intensity ratio of outgoing and incoming light is less than 0.1, and preferably less than 0.01. The specified voltage difference between the electrodes 640 and 650 may be less than about 5 volts, and preferably less than about 3 volts.

A contrast ratio Iout(E>0)/Iout(E=0) can be defined to describe the EAM device operation, where Iout(E>0) is the output light intensity when a specified electric field is applied to the core region 610 and Iout(E=0) is the output light intensity when no electric field is applied to the core region 610. The contrast ratio is preferably less than about 0.9, and more preferably less than 0.5.

In some embodiments, the length of the EAM core region 610 is less than about 100 µm, preferably less than about 20 µm, and more preferably about 10 µm. In one embodiment, the thickness of the EAM core region 610 is less than about 3 µm, and preferably about 1 µm. The width of the EAM core region 610 may be less than about 3 µm, and preferably about 1 µm.

It should be appreciated that although FIG. 6 shows an embodiment with a specific arrangement for the EAM core region, optical cladding layers, waveguide segments, and electrodes, any number of modifications are possible while still retaining the functionality of system 600. Any or all of the features of the embodiments shown in FIGS. 3–5 may be replaced and/or combined with features shown in system 600. For example, electrode 650 may be replaced with an electrode placed in contact with optical clad layer 630, as shown in the EAM device 300.

System 600 may be modified in any number of ways. The thickness of the optical clad layers 620 and/or 630 cladding the EAM core region 610 can be varied. The length of electrode 640 can be extended or shortened, thereby making the electrode 640 longer or shorter than the EAM core region 610. The thickness of the EAM core region 610 can be modified, thereby making the EAM core region thicker or thinner than the waveguide core regions 675a and/or 675b. Any of these modifications can be implemented separately, used in combination with each other, or combined with any other modification, as the invention is not limited to the embodiment of system 600 shown in FIG. 6.

In accordance with some embodiments, an EAM device and/or integrated EAM waveguide system comprising quantum-confined structures in the EAM core region is fabricated.

In some embodiments, an EAM device and/or integrated EAM waveguide system comprising quantum dots in the EAM core region is fabricated.

Figure 7A:
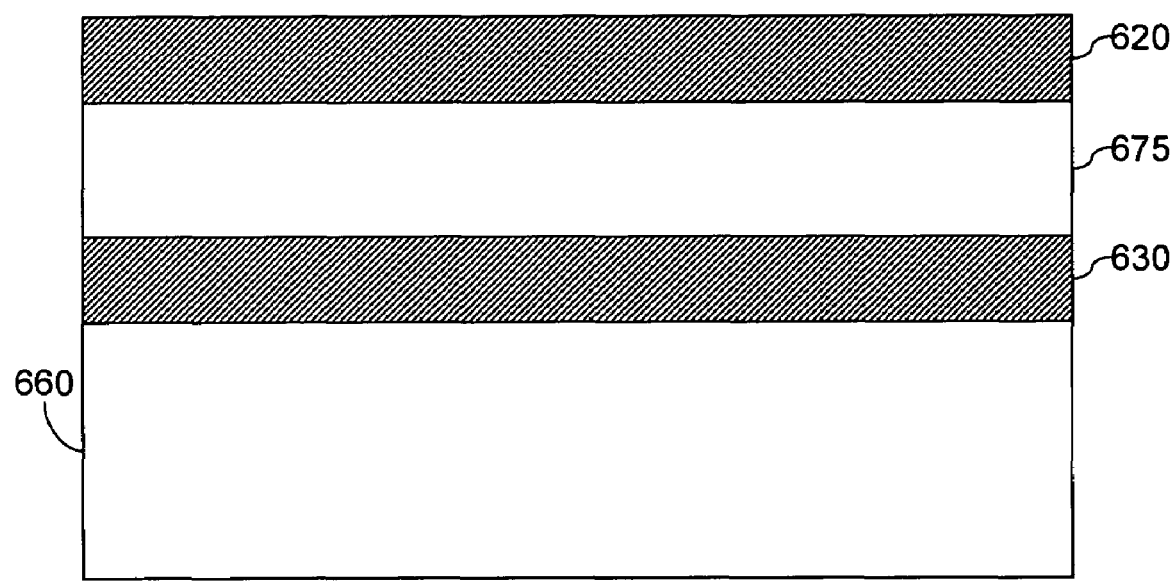
FIGS. 7a–e are schematic illustrations of process steps for fabricating an EAM device comprising quantum dots.

As illustrated in FIG. 7a, the fabrication can comprise disposing an optical cladding layer 630 over a substrate 660. Substrate 660 may comprise any material or combination of materials, including a silicon substrate, a germanium substrate, a III-V substrate, or any other material, as the invention is not limited in this respect. The substrate 660 can be a conducting substrate that allows for the formation of an electrode on the backside of substrate 660. Substrate 660 can be an insulating or semi-insulating substrate that may serve as an optical clad, thereby allowing for the omission of optical cladding layer 630.

Optical cladding layer 630 may comprise any material that provides optical confinement for light of one or more specified wavelengths. The optical cladding layer 630 can comprise an insulator, a semiconductor, and/or any other material, as the invention is not limited in this respect.

The optical cladding layer 630 may be deposited and/or grown on the substrate 660. The optical clad layer 630 may be deposited on the substrate 660 using chemical and/or physical deposition techniques. Chemical deposition techniques include plasma enhanced CVD (PECVD), low pressure CVD (LPCVD), rapid thermal CVD (RTCVD), and atmospheric pressure CVD (APCVD). Physical deposition techniques include sputtering, reactive sputtering, pulsed laser deposition, electron beam evaporation, thermal evaporation, and molecular beam epitaxy (MBE).

In some embodiments, the optical cladding layer 630 may be grown using oxidation of the substrate 660. When the substrate 660 comprises a silicon surface, thermal oxidation can produce an optical cladding layer 630 comprising silicon oxide, possessing an index of refraction of about 1.5.

In some embodiments, the optical cladding layer 630 may comprise silicon oxynitride, possessing an index of refraction between about 1.5 and about 2.0, depending on the nitride content. In some embodiments, the optical cladding layer 630 comprises silicon oxide and/or silicon nitride.

Core layer 675 is then disposed over optical cladding layer 630. In one embodiment, the core layer 675 may be deposited over optical cladding layer 630 using chemical and/or physical deposition techniques. Chemical deposition techniques include plasma enhanced CVD (PECVD), low pressure CVD (LPCVD), rapid thermal CVD (RTCVD), and atmospheric pressure CVD (APCVD). Physical deposition techniques include sputtering, reactive sputtering, pulsed laser deposition, electron beam evaporation, thermal evaporation, and molecular beam epitaxy (MBE).

In some embodiments, the core layer 675 comprise silicon oxynitride, possessing an index of refraction between about 1.5 and about 2.0, depending on the nitride content. In one embodiment, the core layer 675 comprises silicon oxynitride possessing an index of refraction larger than an optical cladding layer 630 comprised of silicon oxide.

Optical cladding layer 620 can then be disposed over core layer 675. The optical cladding layer 620 may be deposited over core layer 675 using any of the above-mentioned deposition techniques. The optical cladding layer 620 may be comprised of the same material as optical cladding layer 630. In some embodiments, the optical cladding layers 620 and 630 may comprise different materials. The optical cladding layer 630 may comprise silicon oxynitride, possessing an index of refraction between about 1.5 and about 2.0, depending on the nitride content. The optical cladding layer 630 may comprise silicon oxide.

Any combination of materials for optical cladding layer 630, core layer 675, and optical cladding layer 620 may be used to provide optical confinement of light possessing one or more specified wavelengths. To ensure optical confinement, the effective refractive index (i.e., spatially averaged) of the core layer 675 can be chosen to be larger than the effective refractive index of the optical cladding layers 620 and 630. The thickness of the core layer 675 may be chosen to support a desired number of optical modes for specified wavelengths.

The thickness of each optical cladding layer 620 and 630 can be chosen to provide sufficient optical confinement to meet specified optical waveguide power loss per length requirements, as is well-known to those of ordinary skill in the art. In some embodiments, the core layer 675 has a thickness less than 3 μm, and preferably about 1 μm. In some embodiments, the optical cladding layers 620 and 630 have a thicknesses less than 5 μm.

Figure 7B:
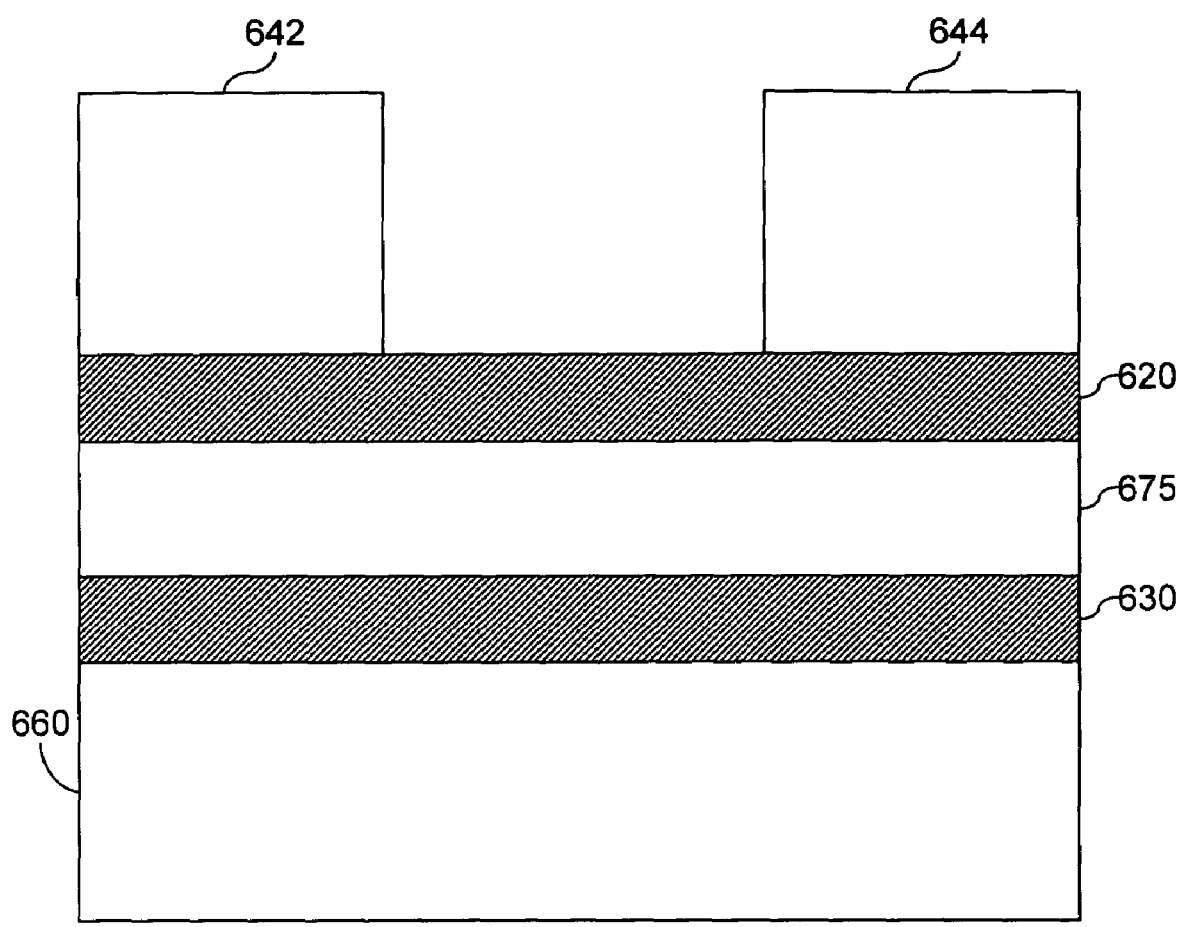

FIG. 7b illustrates a next step of the fabrication method where a conventional photoresist patterning process can be utilized to create photoresist mask regions 642 and 644. A surface of optical cladding layer 620 can be exposed between photoresist mask regions 642 and 644, and can define the desired location of the EAM device.

Figure 7C:
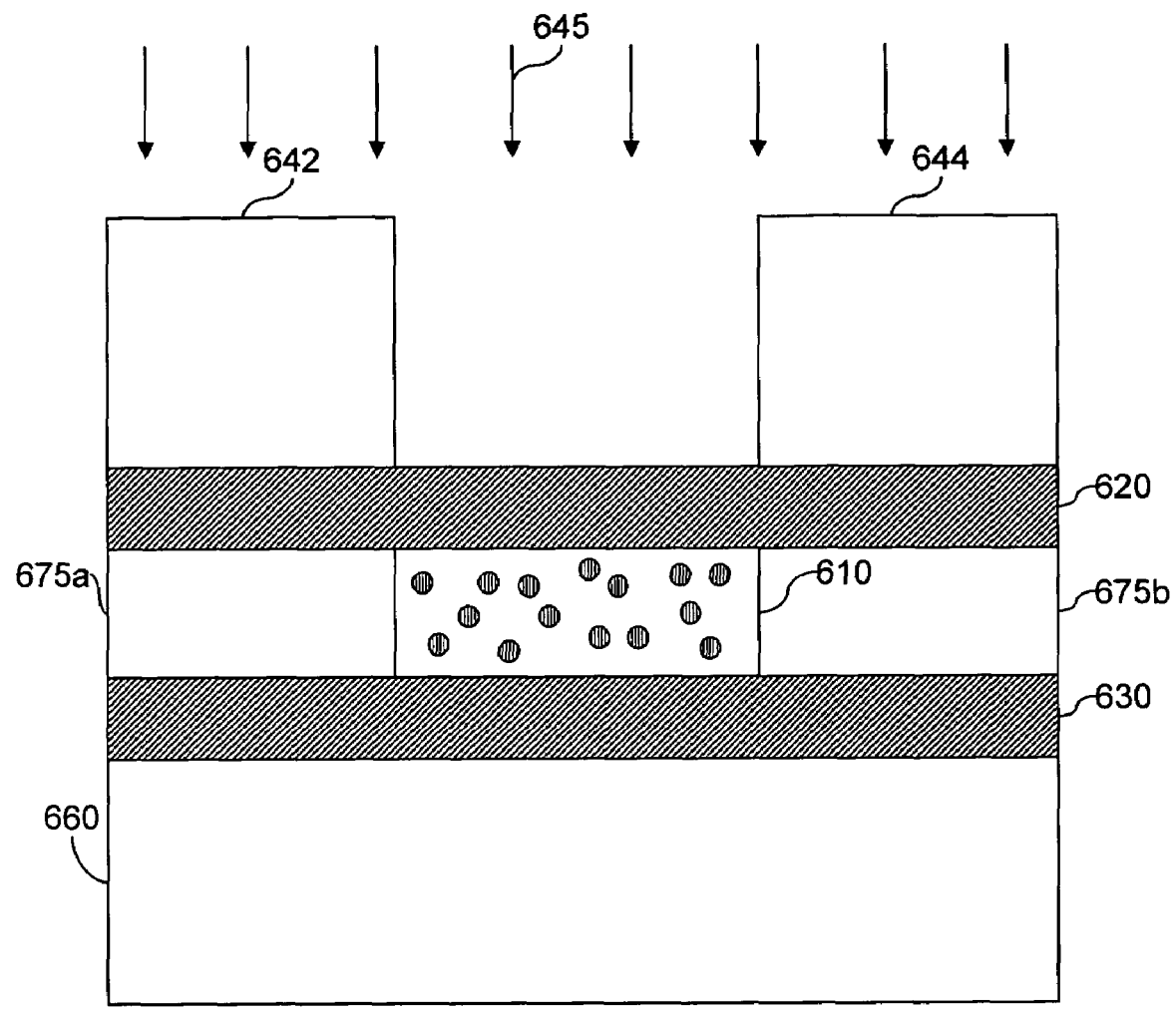

FIG. 7c shows a next step wherein ions may be implanted (indicated by arrows 645) through the surface of the optical cladding region 620, where photoresist mask regions 642 and 644 can be thick enough to ensure that a negligible concentration of ions penetrates into regions below the photoresist mask. The ion energy may be chosen to ensure that the peak of the implantation profile can be located in the center depth of the core region 610, and the implantation dose may be selected so as to implant a desired concentration of ions in the core region. The implantation ions may comprise silicon, germanium, and/or any other ions or combination of ions, as the invention is not limited in this respect.

After the implantation step, an annealing step may be performed at any time during the remaining fabrication process so as to coalesce the implanted ions and form quantum dots with a the desired mean diameter in the core region 610. In one embodiment, the mean diameter of silicon quantum dots is less than 3 nm. In one embodiment, the mean diameter of germanium quantum dots is less than 5 nm.

Figure 7D:
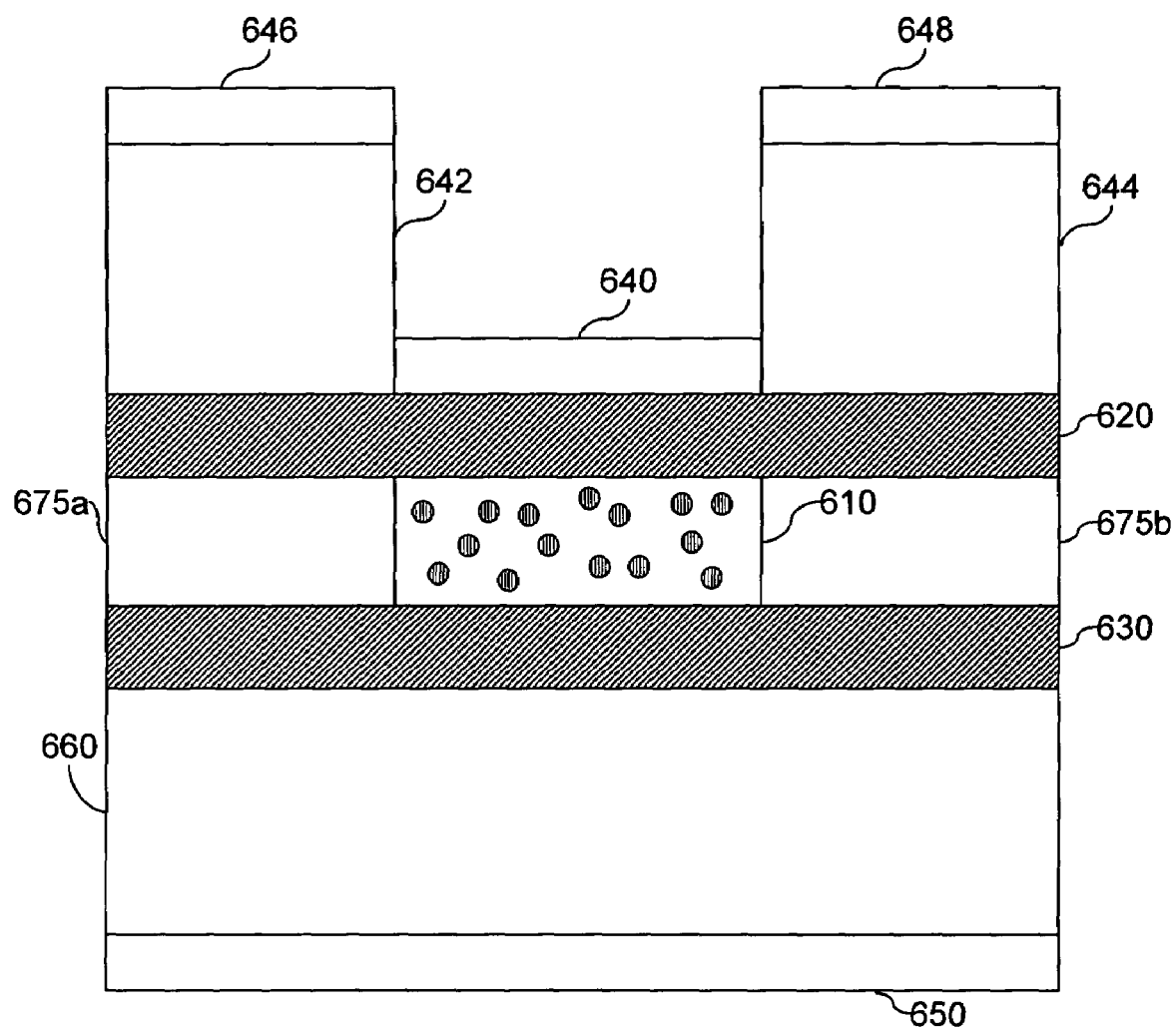

FIG. 7d shows a next step of the fabrication process wherein electrode metal(s) can be anisotropically deposited over the exposed optical cladding region 620 and the photoresist mask regions 642 and 644, forming metal layers 640, 646 and 648. An electrode metal layer can also be deposited on the backside of the substrate 660, forming metal layer 650.

Figure 7E:
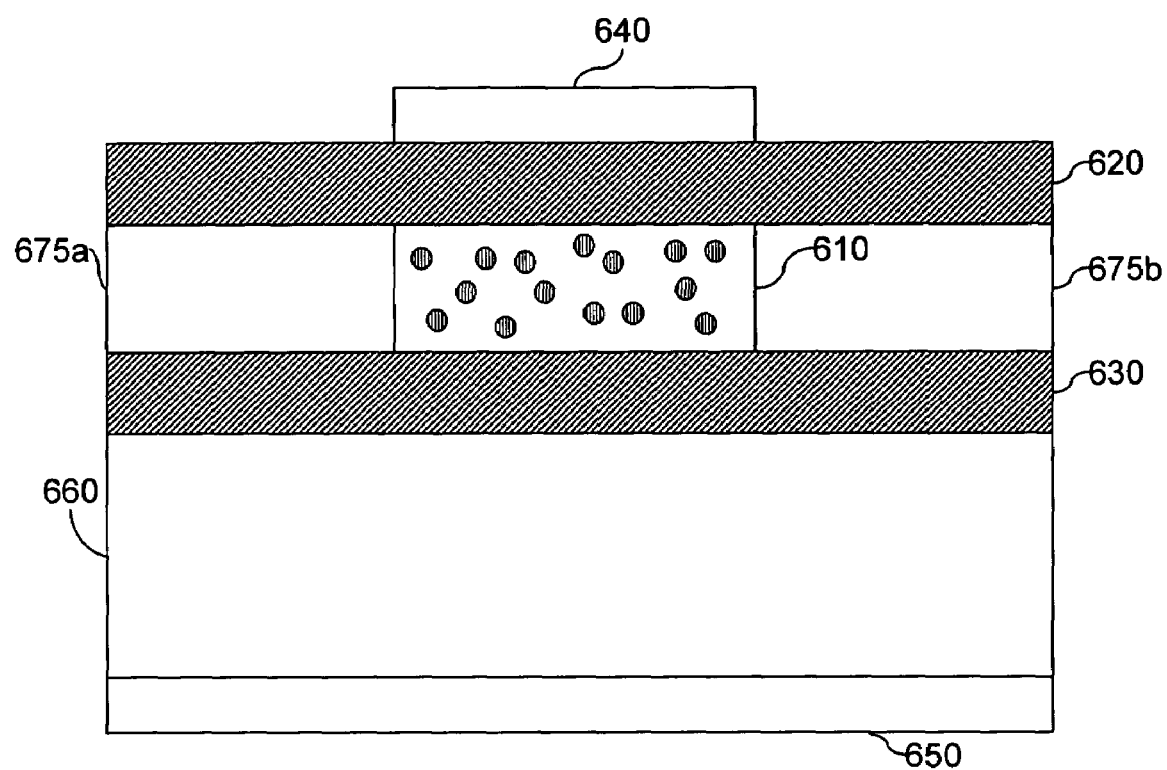

FIG. 7e shows a next step of the process wherein the photoresist mask can be removed (e.g., etched), thereby lifting off metal layers 646 and 648 that are disposed over the photoresist mask regions 642 and 646. The final structure shown in FIG. 7e is an illustrative integrated EAM waveguide system comprising quantum dots within the core region 610, as shown and described in connection with FIG. 6.

It should be appreciated that quantum dots may be incorporated into the core region 610 using any other techniques for forming and including quantum dots into a device. As an example, chemical synthesis may be used in place of, or in addition to, the ion implantation step shown in FIG. 7c. As is well known in the art, wet chemical synthesis can be used to create quantum dots with narrow size distributions. Synthesized quantum dots can be included into the core region using any suitable technique. Such a technique can include first etching exposed regions (i.e., where no photoresist mask is present) shown in FIG. 7b, so as to remove the optical cladding layer 620 and all or some of the core layer 675 under the exposed region. In one embodiment, the synthesized quantum dots may be incorporated into the etched region via a spin-on glass process, wherein a spin-on glass includes the synthesized quantum dots. A lift-off process may then be performed to remove the photoresist mask 642 and 643 and any spin-on glass present on the photoresist mask 642 and 643. An optical cladding layer may then be deposited over the exposed core region formed via the spin-on process, and metal electrodes may then be formed as described in connection with FIGS. 7d and 7e.

Figure 8A:
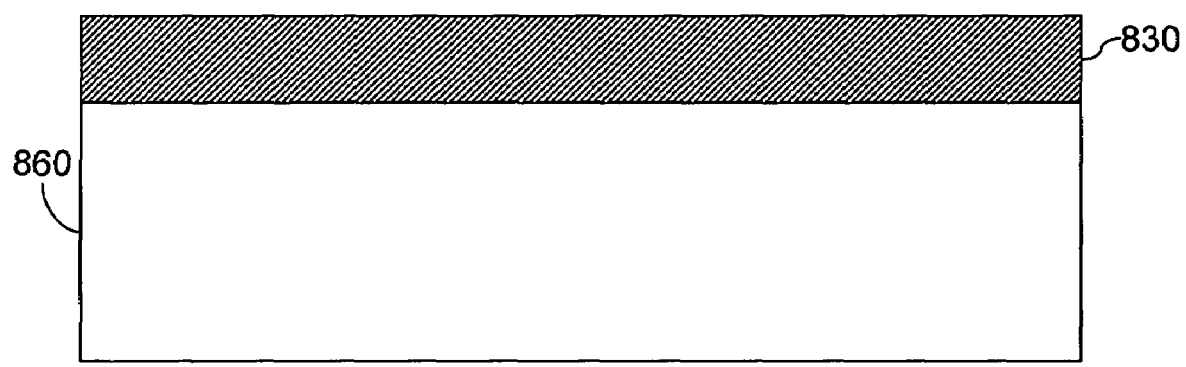
FIGS. 8a–j are schematic illustrations of process steps for fabricating an EAM device comprising quantum wells.

An EAM device and/or integrated EAM waveguide system comprising quantum wells in the EAM core region may be fabricated. FIG. 8a illustrates a first step of a method that may comprise disposing an optical cladding layer 830 over a substrate 860. The substrate 860 may comprise any material or combination of materials, including silicon, germanium, a III-V semiconductor, or any other material, as the invention is not limited in this respect. In some embodiments, the substrate 860 may be conductive, so as to facilitate the use of an electrode on the backside of the substrate 860. The substrate 860 can be an insulating or semi-insulating substrate that may serve as an optical cladding, thereby allowing for the omission of the optical cladding layer 830.

Optical cladding layer 830 may comprise any material that provides optical confinement for light of one or more specified wavelengths. The optical cladding layer 830 can comprise an insulator, a semiconductor, and/or any other material, as the invention is not limited in this respect.

The optical cladding layer 830 may be deposited and/or grown on the substrate 860 using, for example, chemical and/or physical deposition techniques. Chemical deposition techniques include plasma enhanced CVD (PECVD), low pressure CVD (LPCVD), rapid thermal CVD (RTCVD), and atmospheric pressure CVD (APCVD). Physical deposition techniques include sputtering, reactive sputtering, pulsed laser deposition, electron beam evaporation, thermal evaporation, and molecular beam epitaxy (MBE).

In some embodiments, the optical cladding layer 830 may be grown using oxidation of the substrate 860. When the substrate 860 comprises a silicon surface, thermal oxidation can produce an optical cladding layer 830 comprising silicon oxide, possessing an index of refraction of about 1.5.

In some embodiments, the optical cladding layer 830 comprise silicon oxynitride, possessing an index of refraction between about 1.5 and about 2.0, depending on the nitride content. In some embodiments, the optical cladding layer 830 comprises silicon oxide and/or silicon nitride.

Figure 8B:
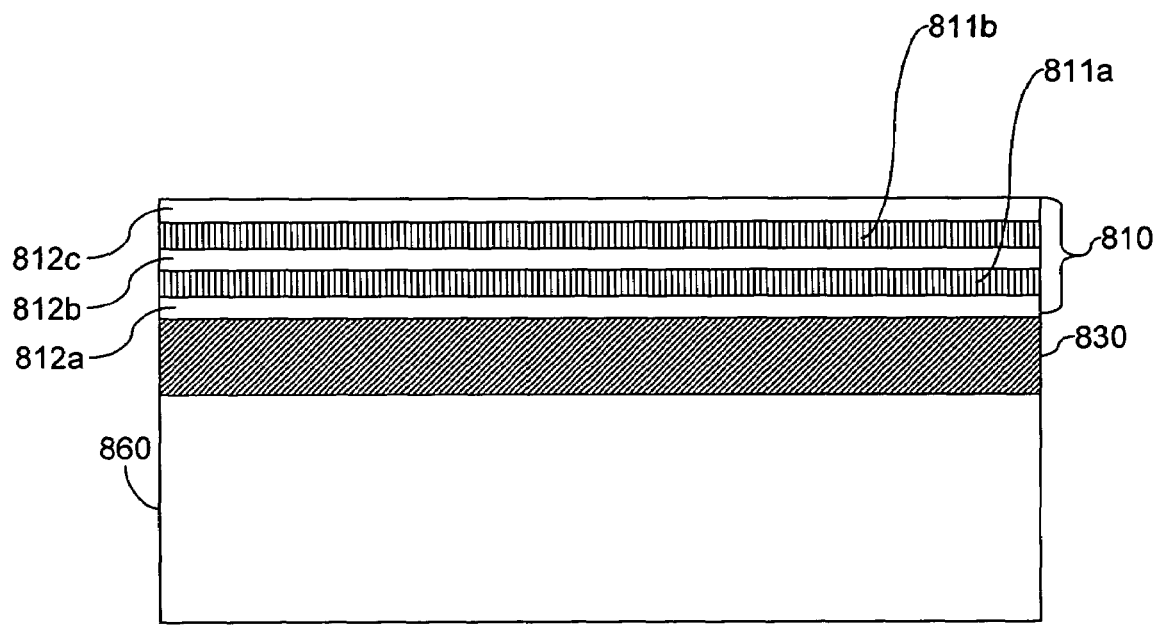

FIG. 8b shows a next step in the process whereby a core layer 810 comprising quantum wells 811a–b is disposed over the optical cladding layer 830. Separation layers 812a–c may be disposed between the quantum wells 811a–c, thereby forming a multiple quantum well structure. Although FIG. 8b shows two quantum wells 811a–b, the core region 810 may comprise any number of quantum wells, as the invention is not limited in this respect.

The quantum wells 811a–b may be separated by any material that forms a suitable potential barrier providing carrier quantum confinement. The layers 812 separating the quantum wells 811a–b may be, for example, semiconductor and/or insulating materials possessing bandgaps larger than the quantum wells. To provide a larger potential barrier, the quantum wells 811a–b may be separated by a wide bandgap semiconductor, an insulator, and/or any other material possessing a bandgap larger than the quantum wells. Examples of wide bandgap semiconductors include nitride-based semiconductors and carbide-based semiconductors. The quantum wells 811a–b may be separated by an insulating material, including an oxide, a nitride, a carbide, or any other suitable insulator, as the invention is not limited in this respect. Examples of oxides, nitrides, and carbides include silicon oxide, silicon nitride, and silicon carbide, respectively. Any mixture of different insulating materials may be used to separate the quantum wells 811a–b, including silicon oxynitride, silicon oxycarbide, or any other suitable mixture, as these are merely examples, and the invention is not limited in this respect.

The quantum wells 811a–b may comprise any material, including any semiconductor, and can be composed of crystalline, poly-crystalline, and/or amorphous materials. Semiconductor quantum wells may be comprised of silicon, germanium, silicon germanium, any III-V semiconductor, any II-VI semiconductor, or any other semiconductor material, as the invention is not limited in this respect. Quantum wells 811a and 811b may be formed of the same material, or may be formed of different materials, as the invention is not limited in this respect.

The quantum wells 811a–b may be formed using any number of techniques, including deposition and/or wafer bonding.

Quantum wells 811a–b may be formed by wafer bonding a transfer wafer to the surface of the optical cladding layer 830. The transfer wafer may comprise one or more of the quantum wells 811a–b. The quantum wells 811a–b may be transferred from the transfer wafer using any transfer techniques, including defoliation via ion implantation, backside etch-back of the transfer wafer, and/or any other approach, as the invention is not limited in this respect.

Prior to wafer bonding and transferring the quantum wells 811a–b, a first separation layer 812a can be formed over the optical cladding layer 830. The first separation layer 812a may be formed using deposition, and/or wafer bonding, as the invention is not limited in this respect. The first separation layer 812a can be deposited over the optical cladding layer 830 using any of the previously described deposition techniques. In another embodiment, the first separation layer 812a is wafer bonded and transferred to the optical cladding layer 830. Next, a first quantum well 811a can be wafer bonded and transferred onto the first separation layer 812a.

Then, a second separation layer 812b can be disposed over the second quantum well 811b, using techniques described in connection with the first separation layer 812a. Then, a second quantum well 811b can be disposed over the second separation layer 812b using wafer bonding, as described in connection with the first quantum well 811a. Next, a third separation layer 812c may be disposed over the second quantum well 811b, using techniques described in connection with the first separation layer 812a.

It should be appreciated that any number of quantum wells may be incorporated in the core layer 810 using the aforementioned approach. Also, the thickness of the separation layers 812a–c may be chosen so that the core layer 810 possesses a desired thickness. In particular, the thickness of the core layer 810 may be chosen to support one or more light waveguide modes, depending on the refractive index difference between the core layer 810 and the optical cladding layers.

In one embodiment, the quantum wells 811a–b and the separation layers 812a–c may be formed using one or more deposition techniques. In one embodiment, the optical cladding layer 830 is a non-crystalline insulator, and the quantum wells 811a–b and separation layers 812a–c can be amorphous and/or poly-crystalline materials. The quantum wells 811a–b and the separation layers 812a–c may be formed using chemical and/or physical deposition techniques. Chemical deposition techniques include plasma enhanced CVD (PECVD), low pressure CVD (LPCVD), rapid thermal CVD (RTCVD), and atmospheric pressure CVD (APCVD). Physical deposition techniques include sputtering, reactive sputtering, pulsed laser deposition, electron beam evaporation, thermal evaporation, and molecular beam epitaxy (MBE).

Figure 8C:
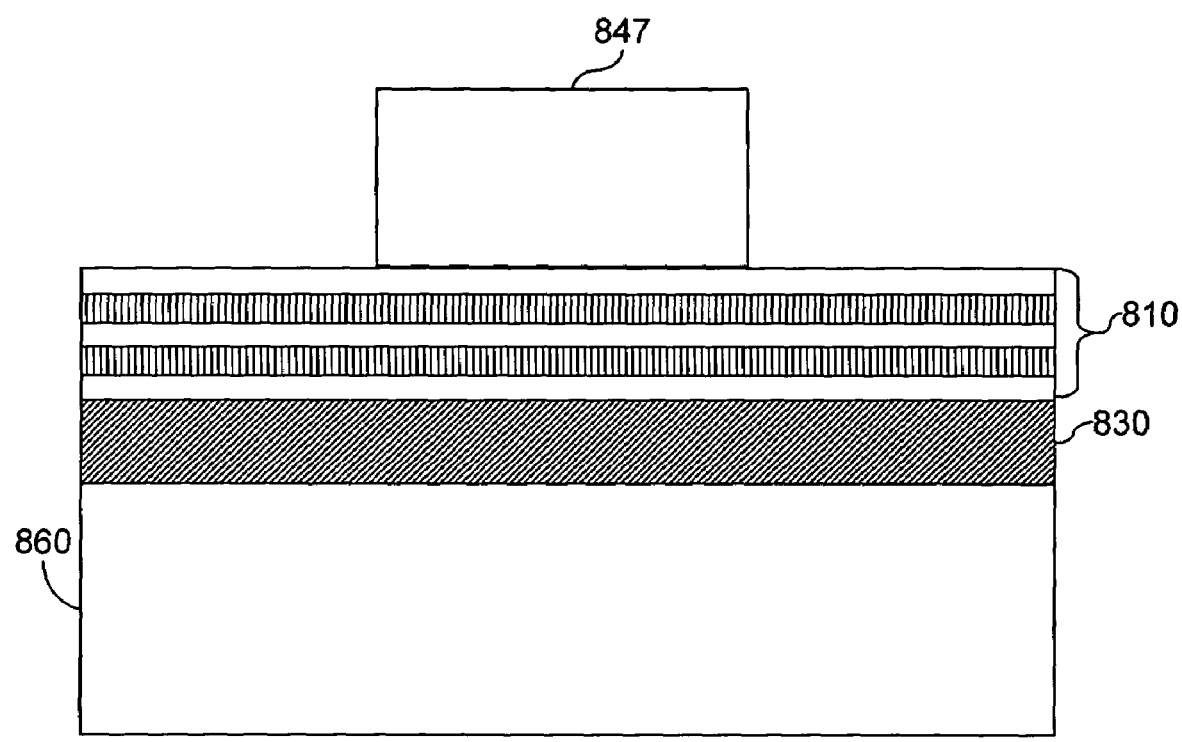

FIG. 8c illustrates a next step whereby a photoresist mask 847 can be patterned over the core layer 810. The photoresist mask 847 can define the EAM region, and can possess a length about as long as the desired EAM device.

Figure 8D:
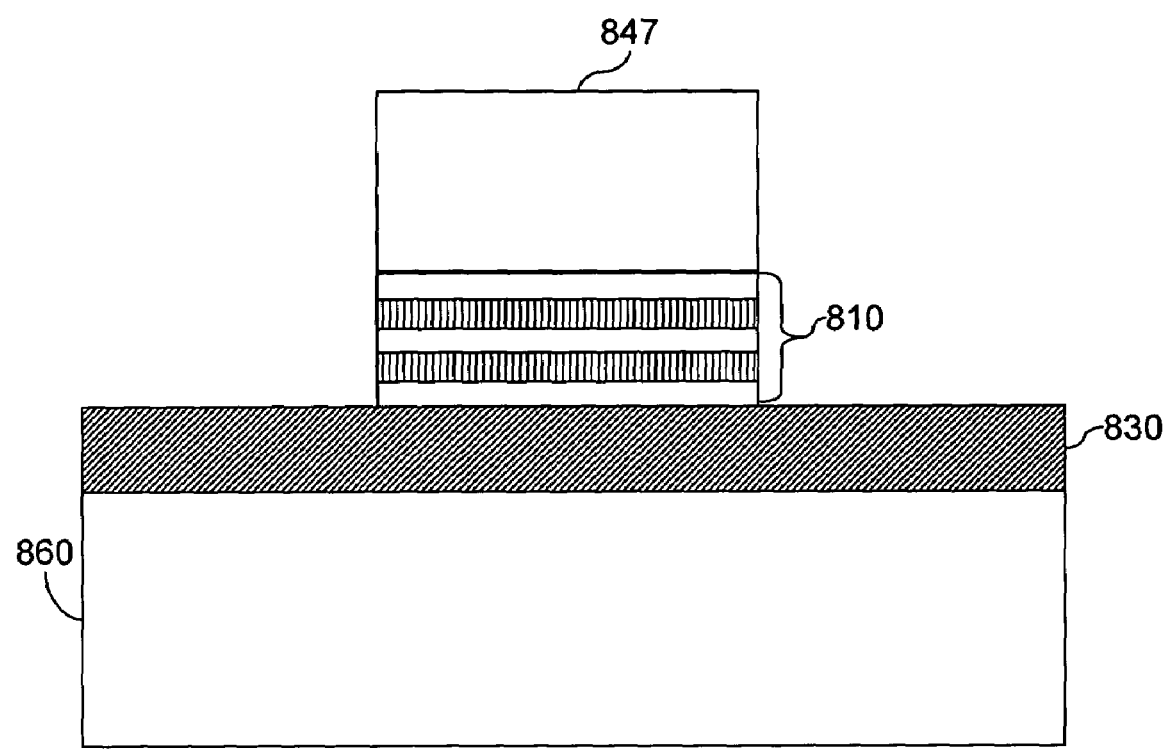

FIG. 8d shows a next step, whereby exposed regions of the core layer 810 can be removed. One or more etches may be used to remove the core layer 810 in exposed regions. The etch may be a dry or wet etch, and may be isotropic or anisotropic. Anisotropic etches can ensure that there is no undercut etching of the core region under the photoresist mask 847. The etch may be chemically selective so that the etching process stops on the optical cladding layer 830, and/or the etch time may be timed so that the etch stops in the vicinity of the optical cladding layer 830.

Figure 8E:
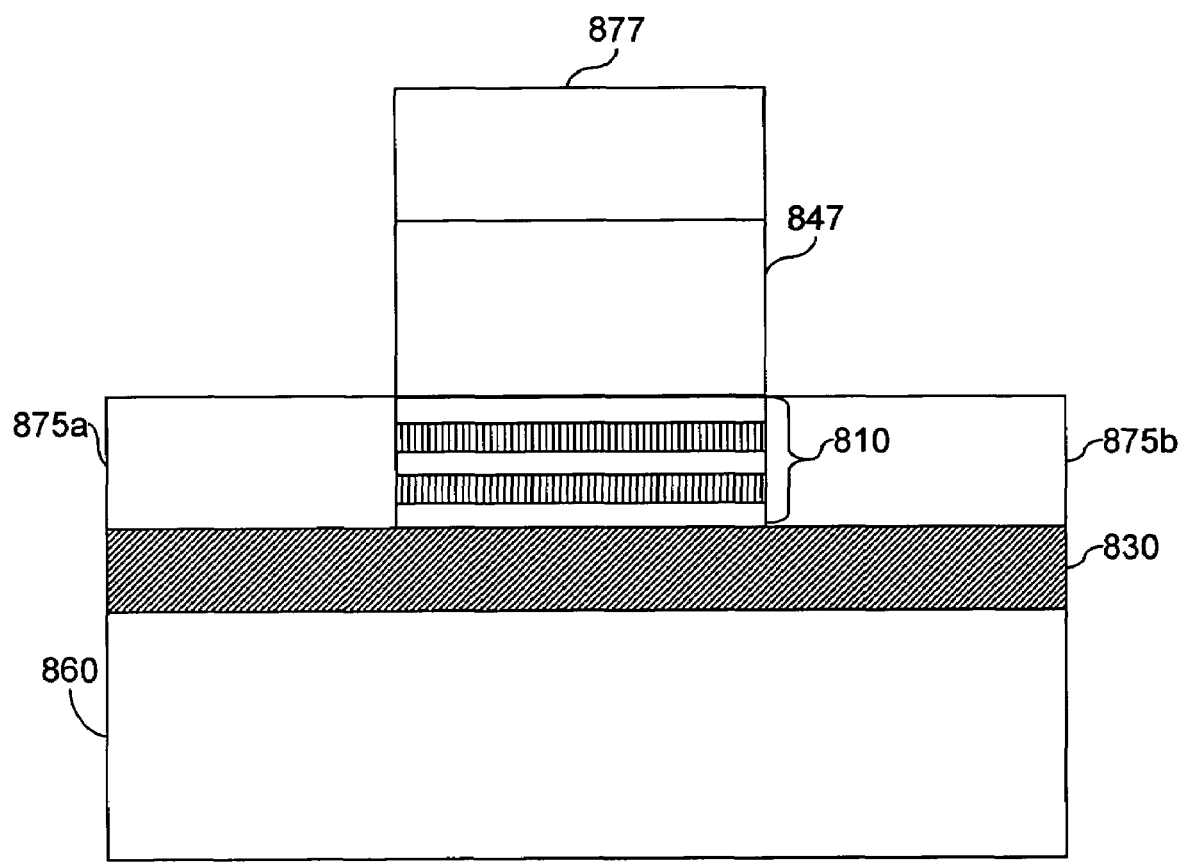

FIG. 8e shows a next step, depicting a result of anisotropically depositing a waveguide core material over the exposed optical cladding layer 830 and the photoresist mask 847, forming layers 875a, 875b and 877. In one embodiment, the waveguide core regions 875a and 875b may comprise silicon oxynitride, silicon nitride, silicon, and/or any other material, as the invention is not limited in this respect. The deposition process may comprise any chemical and/or physical deposition process, as previously described in the context of other deposition steps.

Figure 8F:
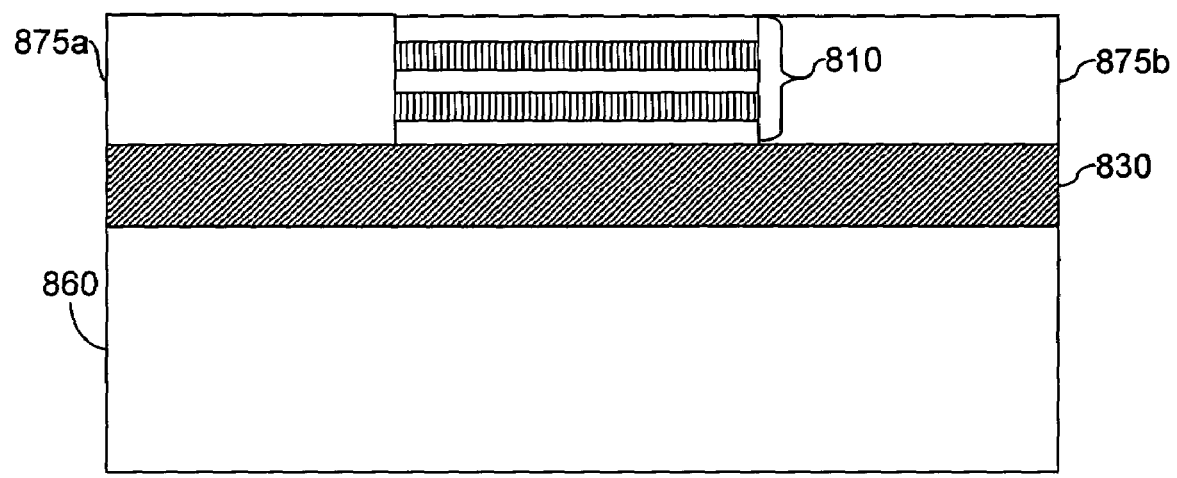
Figure 8G:
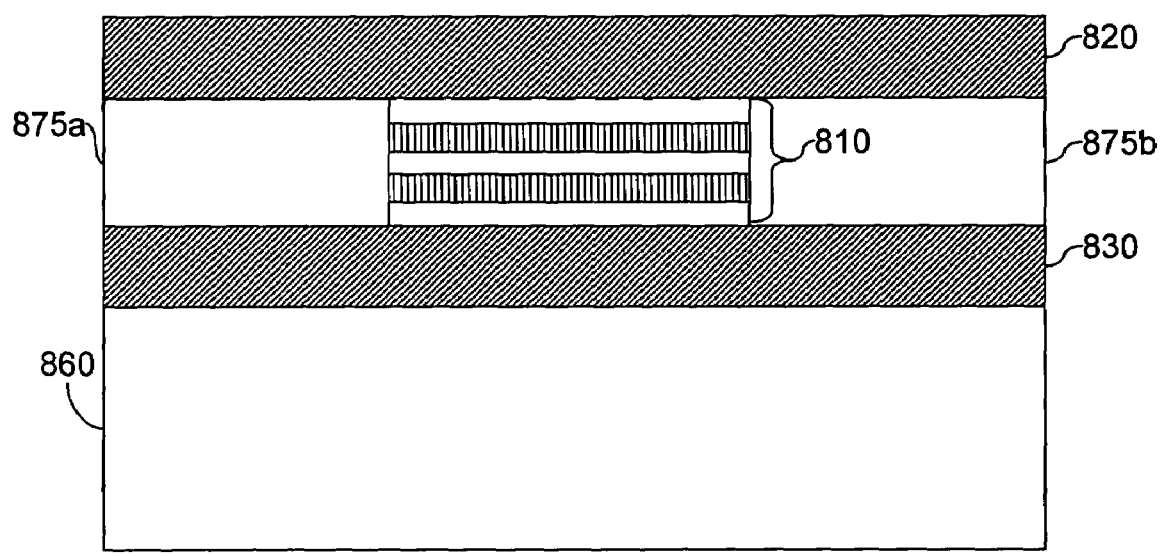

FIG. 8f illustrates a next step whereby the photoresist mask 847 has been etched off, thereby lifting off layer 877 that was deposited over the photoresist mask 847. Then, as shown in FIG. 8g, an optical cladding layer 820 can be deposited over the waveguide core regions 875a and 875b, and the core region 810. The optical cladding layer 820 may comprise any number of materials and may be deposited using various deposition techniques, as previously described in connection with optical cladding layer 830.

Figure 8H:
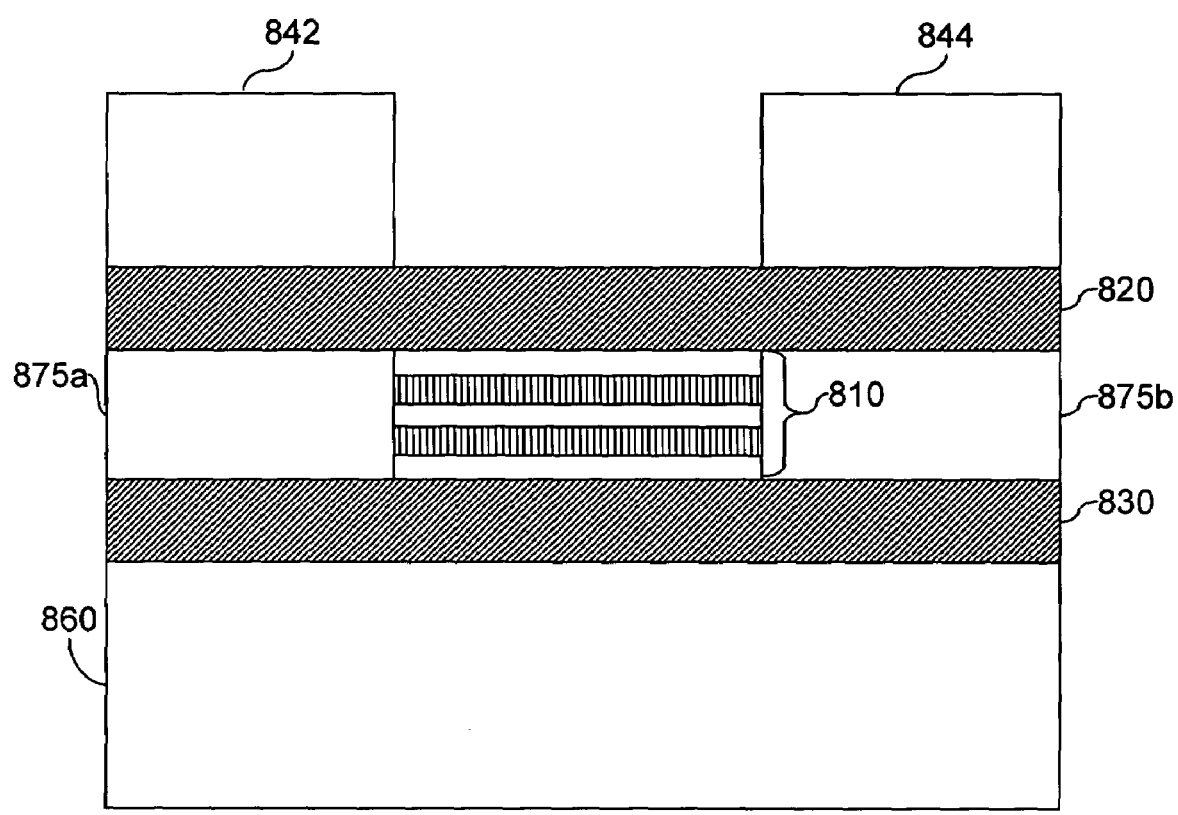
Figure 8I:
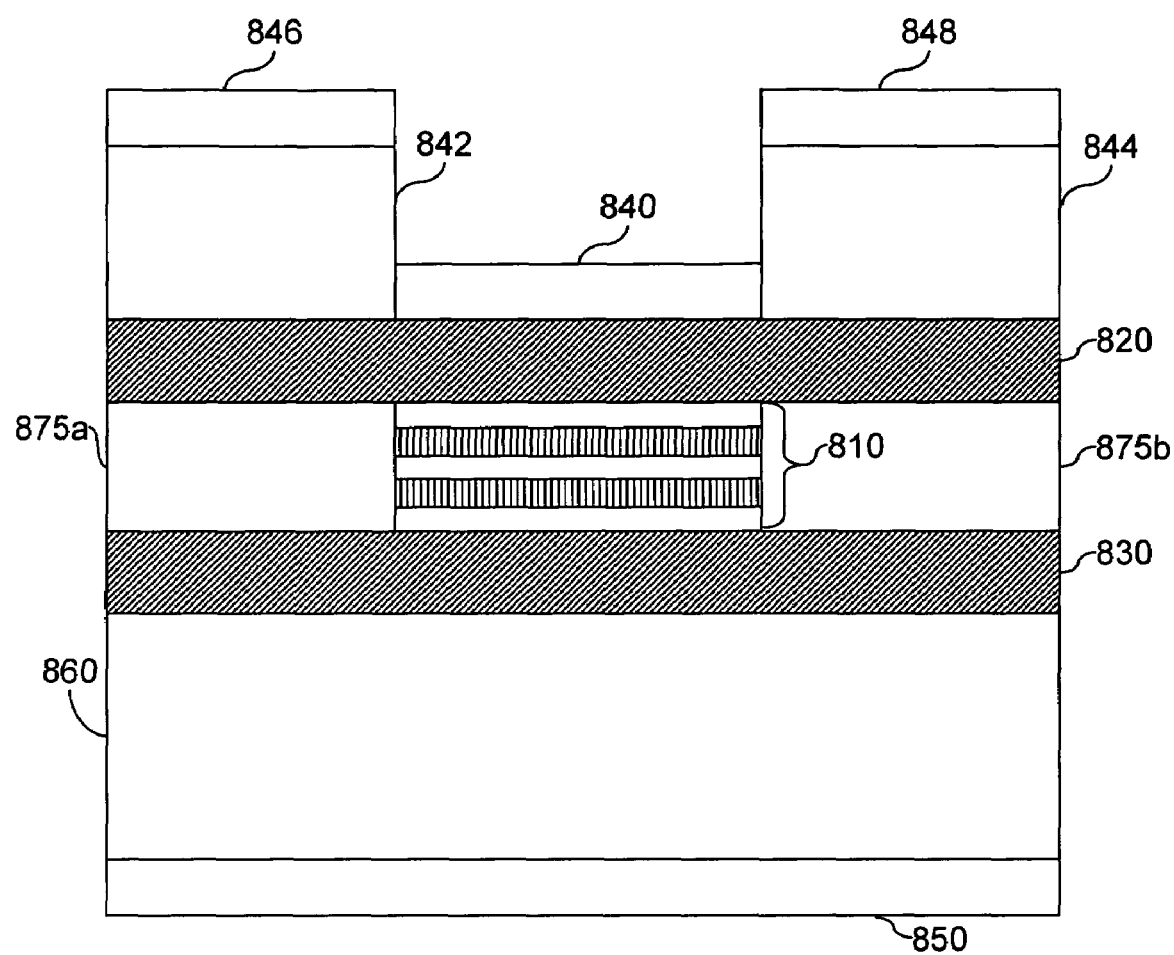
Figure 8J:
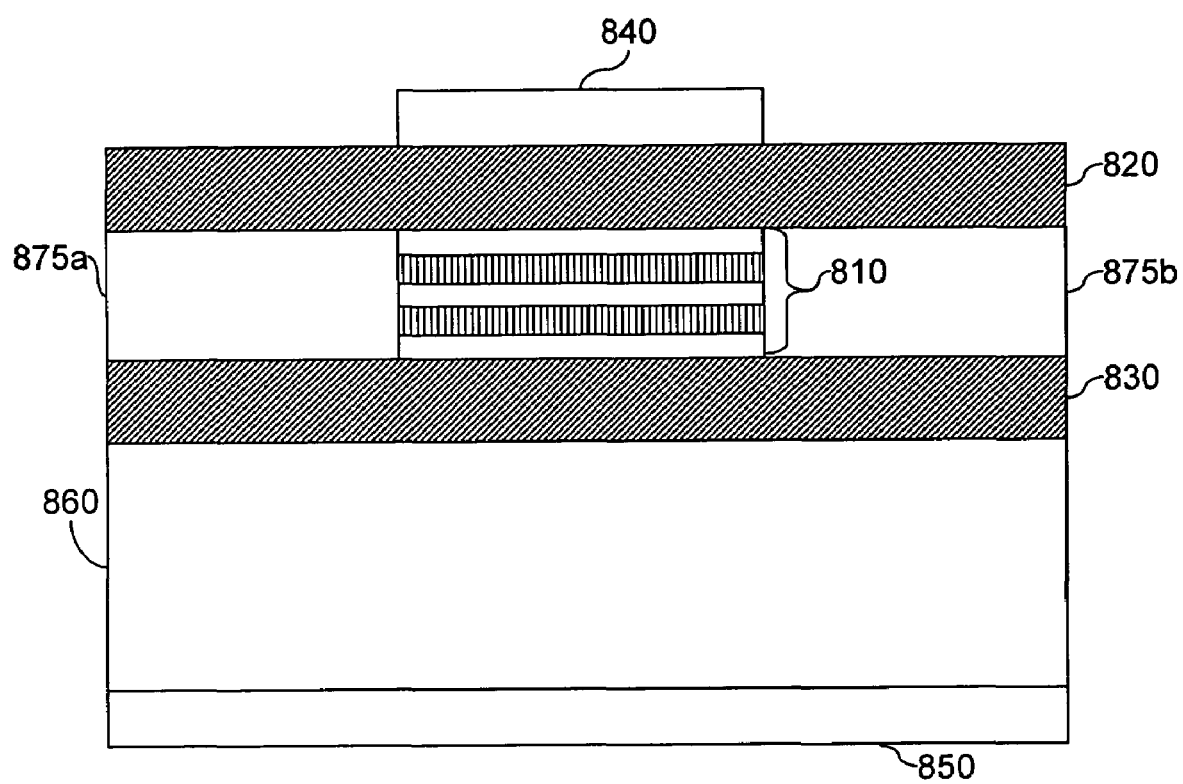

FIGS. 8h–j show process steps that may then be used to form electrodes for the EAM device. FIG. 8h illustrates a step whereby a photoresist mask 842 and 844 is patterned so that the exposed region is over the core region 810. FIG. 8i shows a next step of the fabrication process wherein metal can be anisotropically deposited over the exposed optical cladding region 820 and the photoresist mask regions 842 and 844, forming metal layers 840, 846 and 848. A metal layer can also be deposited on the backside of the substrate 860, forming metal layer 850.

FIG. 8j shows the next step of the process wherein the photoresist mask is etched, thereby lifting off metal layers 846 and 848. The final structure, shown in FIG. 8j, is an integrated EAM waveguide system comprising quantum wells within the core region 810.

In some embodiments, both optical cladding layers of the EAM device are insulators, and hence the EAM device may be non-conductive. One effect of this arrangement is that electron-hole pairs created in the EAM active regions (e.g., quantum wells and/or dots) may be confined. Buildup of charge carriers in the active regions can cause screening of the electric field via the creation of electric dipoles that counter the applied field. Also, if the buildup of carriers is sufficiently high, the absorption coefficient of the EAM device can saturate. We have appreciated that various structures and methods may ameliorate these effects.

Charge screening can be countered by using quantum wells and/or dots possessing a sufficiently small confinement dimension so that electron and hole envelope wavefunctions retain a high degree of overlap in the presence of an electric field. The high degree of overlap can prevent significant charge separation and electric field screening. Also, when the material surrounding the active regions (e.g., the matrix for quantum dots, and the separation material for quantum wells) is an insulator, an increased amount of active region-insulator interfacial area, can encourage faster recombination of carriers.

Properties of the active region-insulator interface can be engineered by varying the composition of the insulator to increase dangling bond concentration at the interface, which can increase the rate of carrier recombination. In one embodiment, carrier recombination can be increased through the addition of impurities to the active regions (e.g., quantum wells and/or dots). In some embodiments, the impurities comprise traps and/or network modifiers. The addition of traps to the active regions can create midgap states that can shorten the recombination lifetime. Traps can include transition metals (e.g., iron), noble metals (e.g., gold), or any other material that exhibits trapping behavior. When the active regions comprise amorphous materials, the addition of network modifiers can increase the number of dangling bonds in amorphous active regions (e.g., quantum wells and/or dots), which can shorten the recombination lifetime. In one embodiment, nitrogen is used as a network modifier in amorphous silicon quantum wells.

Embodiments of the invention may be utilized to modulate the intensity of a beam of light being transmitted through an EAM device, thus enabling the encoding of data as an optical signal through amplitude modulation. In some embodiments, the EAM device can serve as a modulator for optical interconnect systems for CMOS integrated circuits on silicon wafers. An EAM optical modulator in an optical interconnect system can enable electronic-based circuitry (e.g., CMOS circuits) to encode data as an optical signal for transmission to other regions on a chip. Upon arrival, the optical signal can be decoded by a photodetector and converted back into an electrical signal.

In some embodiments, an on-chip and/or off-chip light source can generate light which is coupled into an EAM device. A narrow spectral range can be achieved either by using a naturally narrow source, such as a semiconductor laser, or by filtering a broad source, such as an LED. An EAM device can be inserted directly into a waveguide, thus allowing for very efficient coupling of light from a waveguide to the EAM device and out to another waveguide. In addition to optical interconnects, the device is also suitable for use with many other optical systems, including photonic integrated circuits and bulk fiber optic systems.

In some embodiments, an EAM device comprising quantum-confined structures and having a length of about 10 sun, an insulating optical cladding thickness of about 1 μm, and a width of about 1 μm, is predicted, based on theoretical estimates, to dissipate less that 1 μW, and preferably less than about 0.2 μW at 1 GHz. The speed the EAM device may be limited by the resistance-capacitance time constant, and hence lower capacitance can imply higher speeds. An EAM device with an insulating optical cladding, having a thickness greater than 0.5 µm, has an associated capacitor that can be considerably thicker and have a smaller area as compared to prior art modulators, which is predicted, based on theoretical estimates, to result in smaller capacitance and faster speeds. Also, an EAM device having insulating optical cladding with a thickness greater than about 0.5 µm, and preferably greater than 1 µm, is predicted to exhibit insignificant power dissipation due to carrier tunneling. An EAM device using the QCSE and having insulating optical cladding is predicted, based on theoretical estimates, to have a length 20 times smaller than a plasma dispersion modulator operating under similar conditions.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An electro-absorption light intensity modulator device, comprising:
    a first layer, the first layer comprising a first insulator layer; and
    a second layer, the second layer disposed relative to the first layer to provide a light-absorbing optical confinement region; and
    wherein the light-absorbing optical confinement region comprises at least one quantum-confined structure, the at least one quantum-confined structure possessing dimensions such that, upon an application of an electric field in the at least one quantum-confined structure, light absorption is at least partially due to a transition of at least one carrier between a valence state and a conduction state of the at least one quantum-confined structure.

2. The electro-absorption light intensity modulator device of claim 1, wherein the at least one quantum-confined structure comprises a plurality of quantum wells.

3. The electro-absorption light intensity modulator device of claim 2, wherein at least two surfaces of at least one of the plurality of quantum wells are at least partially disposed in contact with insulating material.

4. The electro-absorption light intensity modulator device of claim 1, wherein the at least one quantum-confined structure comprises a plurality of quantum dots.

5. The electro-absorption light intensity modulator device of claim 4, wherein the plurality of quantum dots are surrounded by an insulating matrix.

6. The electro-absorption light intensity modulator device of claim 5, wherein the insulating matrix comprises an oxide matrix.

7. The electro-absorption light intensity modulator device of claim 1, wherein the at least one quantum-confined structure comprises a plurality of amorphous layers.

8. The electro-absorption light intensity modulator device of claim 1, wherein the at least one quantum-confined structure comprises a plurality of poly-crystalline layers.

9. The electro-absorption light intensity modulator device of claim 1, wherein the second layer comprises a second insulator layer.

10. The electro-absorption light intensity modulator device of claim 1, wherein the second layer comprises a semiconductor.

11. The electro-absorption light intensity modulator device of claim 1, wherein the light-absorbing optical confinement region is disposed in contact with the second layer.

12. The electro-absorption light intensity modulator device of claim 11, wherein the light-absorbing optical confinement region is disposed in contact with the first layer.

13. A waveguide integrated electro-absorption light intensity modulator device, comprising:
    an optical waveguide comprising an optical waveguide core and an optical waveguide clad, wherein the optical waveguide clad comprises an insulator; and
    a light absorption region disposed within at least a portion of the optical waveguide core,
    wherein the light absorption region comprises at least one quantum-confined structure, the at least one quantum-confined structure possessing dimensions such that, upon an application of an electric field in the at least one quantum-confined structure, light absorption is at least partially due to a transition of at least one carrier between a valence state and a conduction state of the at least one quantum-confined structure.

14. The waveguide integrated electro-absorption light intensity modulator device of claim 13, wherein the at least one quantum-confined structure comprises a plurality of quantum wells.

15. The waveguide integrated electro-absorption light intensity modulator device of claim 13, wherein the at least one quantum-confined structure comprises a plurality of quantum dots.

16. A method of fabricating an electro-absorption light intensity modulator device, the method comprising:
    providing a first insulator layer;
    disposing a light absorption region over the first insulator layer; and
    disposing a second insulator layer over the light absorption region,
    wherein the light absorption region comprises at least one quantum-confined structure, the at least one quantum-confined structure possessing dimensions such that, upon an application of an electric field in the at least one quantum-confined structure, light absorption is at least partially due to a transition of at least one carrier between a valence state and a conduction state of the at least one quantum-confined structure.

17. The method of claim 16, wherein the at least one quantum-confined structure comprises a plurality of quantum wells.

18. The method of claim 16, wherein the at least one quantum-confined structure comprises a plurality of quantum dots.

19. The method of claim 18, wherein the plurality of quantum dots are surrounded by an insulating matrix.

20. The method of claim 16, further comprising incorporating impurities into the light absorption region.

21. The method of claim 20, wherein the impurities comprise a metal.

22. The method of claim 16, further comprising incorporating network modifiers into the light absorption region.

23. The method of claim 22, wherein the network modifiers comprise nitrogen.

* * * * *